(12) United States Patent
Kim et al.

(10) Patent No.: US 11,115,868 B2
(45) Date of Patent: Sep. 7, 2021

(54) METHOD AND APPARATUS FOR CONTROL RESOURCE SET CONFIGURATION AND MONITORING OF DOWNLINK CONTROL CHANNEL IN WIRELESS COMMUNICATION SYSTEM

(71) Applicant: Samsung Electronics Co., Ltd., Suwon-si (KR)

(72) Inventors: Taehyoung Kim, Seoul (KR); Youngbum Kim, Seoul (KR); Youngwoo Kwak, Suwon-si (KR); Jeongho Yeo, Hwaseong-si (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/977,609

(22) Filed: May 11, 2018

(65) Prior Publication Data
US 2018/0332505 A1     Nov. 15, 2018

(30) Foreign Application Priority Data

May 15, 2017  (KR) ........................ 10-2017-0060185
Jun. 23, 2017  (KR) ........................ 10-2017-0079945

(51) Int. Cl.
*H04W 28/20*     (2009.01)
*H04L 5/00*      (2006.01)
(Continued)

(52) U.S. Cl.
CPC ........... *H04W 28/20* (2013.01); *H04L 5/0053* (2013.01); *H04L 5/0064* (2013.01);
(Continued)

(58) Field of Classification Search
CPC ..... H04W 28/20; H04W 76/27; H04W 48/12; H04W 72/042; H04W 72/0453;
(Continued)

(56) References Cited

U.S. PATENT DOCUMENTS 9,031,016 B2 *  5/2015  Kim ........................ H04L 5/001
                                                            370/329
9,544,892 B2 *  1/2017  Kim ...................... H04L 5/0053
(Continued)

OTHER PUBLICATIONS

Huawei et al., 'On bandwidth part and bandwidth adaptation', R1-1706900, 3GPP TSG RAN WG1 Meeting #89, Hangzhou, China, May 6, 2017.
(Continued)

*Primary Examiner* — Jenee Holland
(74) *Attorney, Agent, or Firm* — Jefferson IP Law, LLP

(57) ABSTRACT

A communication method and a system for converging a fifth generation (5G) communication system for supporting higher data rates beyond a fourth generation (4G) system with an internet of things (IoT) technology are provided. The disclosure may be applied to intelligent services based on the 5G communication technology and the IoT-related technology, such as a smart home, a smart building, a smart city, a smart car, a connected car, health care, digital education, smart retail, security and safety services. The method includes transmitting, to a terminal, configuration information for configuring a plurality of bandwidth parts for the terminal, wherein at least one control resource set is configured for each of the plurality of bandwidth parts, respectively, transmitting, to the terminal, information for changing a first bandwidth part activated for the terminal to a second bandwidth part, and transmitting, to the terminal, downlink control information in at least one control resource set corresponding to the second bandwidth part.

18 Claims, 21 Drawing Sheets

(51) Int. Cl.
*H04W 72/04* (2009.01)
*H04W 48/12* (2009.01)
*H04W 76/27* (2018.01)

(52) U.S. Cl.
CPC .......... *H04L 5/0091* (2013.01); *H04W 48/12* (2013.01); *H04W 72/042* (2013.01); *H04W 72/0453* (2013.01); *H04W 76/27* (2018.02); *H04L 5/0023* (2013.01); *H04L 5/0048* (2013.01)

(58) Field of Classification Search
CPC ... H04L 5/0053; H04L 5/0064; H04L 5/0091; H04L 5/0023; H04L 5/0048
See application file for complete search history.

(56) References Cited

U.S. PATENT DOCUMENTS

| | | | |
|---|---|---|---|
| 2010/0331030 A1* | 12/2010 | Nory | H04L 5/0053 455/509 |
| 2011/0171985 A1* | 7/2011 | Papasakellariou | H04W 72/0453 455/509 |
| 2011/0243090 A1* | 10/2011 | Grovlen | H04L 1/18 370/329 |
| 2012/0155316 A1* | 6/2012 | Li | H04L 5/0053 370/252 |
| 2012/0190395 A1* | 7/2012 | Pan | H04L 5/0064 455/509 |
| 2012/0201216 A1* | 8/2012 | Wu | H04L 5/0053 370/329 |
| 2013/0286994 A1* | 10/2013 | Liu | H04L 5/0051 370/329 |
| 2014/0112220 A1 | 4/2014 | Kwak et al. | |
| 2014/0254452 A1* | 9/2014 | Golitschek Edler Von Elbwart | H04W 52/0219 370/311 |
| 2015/0131599 A1* | 5/2015 | Xue | H04W 72/042 370/329 |
| 2015/0146668 A1* | 5/2015 | Liu | H04L 27/2613 370/329 |
| 2015/0237604 A1* | 8/2015 | Shi | H04W 76/27 370/330 |
| 2016/0021661 A1* | 1/2016 | Yerramalli | H04W 74/08 370/329 |
| 2016/0128033 A1* | 5/2016 | Larsson | H04W 72/0453 370/329 |
| 2016/0302092 A1 | 10/2016 | Sartori et al. | |
| 2017/0013391 A1* | 1/2017 | Rico Alvarino | H04W 4/70 |
| 2017/0094642 A1* | 3/2017 | Lee | H04L 1/1887 |
| 2018/0034523 A1* | 2/2018 | Kim | H04B 7/0617 |
| 2018/0034612 A1* | 2/2018 | Lin | H04L 5/0048 |
| 2018/0049047 A1* | 2/2018 | Lin | H04W 24/02 |
| 2018/0227156 A1* | 8/2018 | Papasakellariou | H04W 74/006 |
| 2018/0270698 A1* | 9/2018 | Babaei | H04W 72/1284 |
| 2018/0270699 A1* | 9/2018 | Babaei | H04W 28/0278 |
| 2018/0270700 A1* | 9/2018 | Babaei | H04W 28/0278 |
| 2018/0270713 A1* | 9/2018 | Park | H04W 28/18 |
| 2018/0270791 A1* | 9/2018 | Park | H04W 68/04 |
| 2018/0279193 A1* | 9/2018 | Park | H04W 36/08 |
| 2018/0279218 A1* | 9/2018 | Park | H04W 48/20 |
| 2018/0279229 A1* | 9/2018 | Dinan | H04W 52/146 |
| 2018/0279262 A1* | 9/2018 | Babaei | H04L 1/00 |
| 2018/0279289 A1* | 9/2018 | Islam | H04W 72/048 |
| 2018/0324830 A1* | 11/2018 | Islam | H04W 72/1236 |
| 2020/0059345 A1* | 2/2020 | Pelletier | H04L 1/1657 |

OTHER PUBLICATIONS

Huawei et al., 'Resource allocation and indication for data channel', R1-1705069, 3GPP TSG RAN WG1 Meeting #88bis, Spokane, USA, Mar. 26, 2017.
HTC, 'Configuration for search spaces and control resource sets', R1-1708538, 3GPP TSG RAN WG1 Meeting #89, Hangzhou, China, May 5, 2017.
Interdigital Inc., 'Bandwidth Adaptation in NR', R1-1708998, 3GPP TSG RAN WG1 Meeting #89, Hangzhou, China, May 6, 2017.
International Search Report dated Aug. 29, 2018 in International Application No. PCT/KR2018/005430.
Media Tek Inc., Efficient Wider Bandwidth Operations for NR, R1-1707828, 3GPP TSG RAN WG1 #89, May 7, 2017.
LG Electronics, Discussion on CSS configuration for wideband operation, R1-1707627, 3GPP TSG RAN WG1 #89, May 6, 2017.
Korean Office Action dated Jun. 2, 2021, issued in Korean Patent Application No. 10-2017-0079945.

* cited by examiner

METHOD AND APPARATUS FOR CONTROL RESOURCE SET CONFIGURATION AND MONITORING OF DOWNLINK CONTROL CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0060185, filed on May 15, 2017, and a Korean patent application number 10-2017-0079945, filed on Jun. 23, 2017, in the Korean Intellectual Property Office, the disclosure of each of which is incorporated by reference herein in its entirety.

BACKGROUND

Field

The disclosure relates to a wireless communication system. More particularly, the disclosure relates to a method for control resource set configuration and monitoring of a downlink control channel in a next-generation mobile communication system.

Description of Related Art

In order to meet the demand for wireless data traffic that is on an increasing trend after commercialization of fourth generation (4G) communication systems, efforts have been made to develop improved fifth generation (5G) or pre-5G communication system. For this reason, the 5G or pre-5G communication system is also called a beyond 4G network communication system or a post long term evolution (LTE) system. In order to achieve high data rate, implementation of a 5G communication system in an ultrahigh frequency millimeter wave (mmWave) band (e.g., like 60 GHz band) has been considered. In order to mitigate a path loss of radio waves and to increase a transfer distance of the radio waves in the ultrahigh frequency band, technologies of beamforming, massive multi input multi output (MIMO), full dimension MIMO (FD-MIMO), array antennas, analog beamforming, and large scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the internet of things (IoT) where distributed entities, such as things, exchange and process information. The internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched.

Such an IoT environment may provide intelligent internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing IT and various industries.

Accordingly, various attempts have been made to apply the 5G communication system to IoT networks. For example, technologies of sensor network, M2M communication, and MTC have been implemented by techniques for beamforming, MIMO, and array antennas, which correspond to the 5G communication technology. As the big data processing technology as described above, application of a cloud RAN would be an example of convergence between the 5G technology and the IoT technology.

On the other hand, in the 5G communication system, it is intended to support services having not only a high data rate but also very short transmission delay and services requiring high connection density in all. Accordingly, there is an increasing demand for a method for efficiently configuring a control resource set for signal transmission/reception and a method and an apparatus for smoothly performing monitoring of a signal received through the control resource set.

The above information is presented as background information only to assist with an understanding of the disclosure. No determination has been made, and no assertion is made, as to whether any of the above might be applicable as prior art with regard to the disclosure.

SUMMARY

In order to support transmission of downlink and uplink transmission channels in a wireless communication system, downlink control information (DCI) related to this is necessary. In long term evolution (LTE) in the related art, the DCI is transmitted through a physical downlink control channel (PDCCH) that is a separate physical channel on which the downlink control information is transmitted, and the PDCCH is transmitted for each subframe over the full system band. Since one PDCCH carries one DCI message and a plurality of terminals may be simultaneously scheduled to the downlink and uplink, transmission of a plurality of PDCCHs may be simultaneously performed in each cell.

As a reference signal (RS) for PDCCH decoding, a cell-specific reference signal (CRS) that is a cell common reference signal is used. The CRS is an always-on signal transmitted for each subframe over the full band, and scrambling and resource mapping become different in accordance with cell identity (ID). All terminals monitoring the PDCCH estimate channels using the CRS, and perform decoding of the PDCCH. In decoding the PDCCH, the terminal performs blind decoding for a specific control resource set that is defined as a search space. The PDCCH search space is defined as a set of resource candidates on which the PDCCH can be transmitted with respect to various aggregation levels.

Unlike the existing system, the 5G communication system intends to support services requiring a high transmission rate, services having very short transmission delay, and services requiring high connection density in all. In order to satisfy various user requirements and services in such scenarios, it is important that one system can provide various services having different transmission/reception techniques and transmission/reception parameters, and the system is designed so that services being added in consideration of forward compatibility are not limited by the current system.

In the 5G, unlike the existing LTE, it is necessary that time and frequency resources can be utilized more flexibly. More particularly, in designing control channels, securing of flexibility is one of very important matters. For this, in the 5G communication system, a downlink control channel is not transmitted over the full band of the system, but may be transmitted through a specific sub-band, and the time and frequency resources for transmitting the downlink control channel may be configured to each terminal.

In order to achieve ultrahigh-speed data services reaching several Gbps in the 5G system, signal transmission/reception in the range of several tens to several hundred MHz or ultra-wideband of several GHz is under consideration. However, since power consumption is increased in proportion to the transmission/reception bandwidth, it is necessary to efficiently manage the power consumption of the terminal or the base station through adaptation of the transmission/reception bandwidth. Always-on power can be supplied to the base station, whereas the terminal requires efficient power consumption management due to its battery capacity limitations. Accordingly, if the terminal does not require ultra-wideband signal transmission/reception, the base station can efficiently manage the power consumption of the terminal by changing the transmission/reception band of the terminal to a narrowband.

As described above, for adaptation of the transmission/reception bandwidth, reconfiguration of the control resource set for transmitting the preconfigured downlink control channel may be requested from the terminal. Further, for the adaptation of the bandwidth, the bandwidth or the center frequency location may be controlled in consideration of the preconfigured control resource set. Further, as the terminal operates in the narrowband, it may be necessary to perform monitoring of only a part corresponding to a partial frequency band of the preconfigured full control resource set.

Aspects of the disclosure are to address at least the above-mentioned problems and/or disadvantages and to provide at least the advantages described below. Accordingly, an aspect of the disclosure is to provide a method for efficient control resource set configuration and monitoring of a downlink control channel in an environment in which the transmission/reception bandwidth for a terminal is adapted.

Additional aspects will be set forth in part in the description which follows and, in part, will be apparent from the description, or may be learned by practice of the presented embodiments.

In accordance with an aspect of the disclosure, a method by a base station in a wireless communication system is provided. The method includes transmitting, to a terminal, configuration information for configuring a plurality of bandwidth parts for the terminal, wherein at least one control resource set is configured for each of the plurality of bandwidth parts, respectively, transmitting, to the terminal, information for changing a first bandwidth part activated for the terminal to a second bandwidth part, and transmitting, to the terminal, downlink control information in at least one control resource set corresponding to the second bandwidth part.

In accordance with an aspect of the disclosure, a method by a terminal in a wireless communication system is provided. The method includes receiving, from a base station, configuration information for configuring a plurality of bandwidth parts for the terminal, wherein at least one control resource set is configured for each of the plurality of bandwidth parts, respectively, receiving, from the base station, information for changing a first bandwidth part activated for the terminal to a second bandwidth part, and receiving, from the base station, downlink control information in at least one control resource set corresponding to the second bandwidth part.

In accordance with an aspect of the disclosure, a base station in a wireless communication system is provided. The base station includes a transceiver, and at least one processor configured to control the transceiver to transmit, to a terminal, configuration information for configuring a plurality of bandwidth parts for the terminal, wherein at least one control resource set is configured for each of the plurality of bandwidth parts, respectively, control the transceiver to transmit, to the terminal, information for changing a first bandwidth part activated for the terminal to a second bandwidth part, and control the transceiver to transmit, to the terminal, downlink control information in at least one control resource set corresponding to the second bandwidth part.

In accordance with an aspect of the disclosure, a terminal in a wireless communication system is provided. The terminal includes a transceiver, and at least one processor configured to control the transceiver to receive, from a base station, configuration information for configuring a plurality of bandwidth parts for the terminal, wherein at least one control resource set is configured for each of the plurality of bandwidth parts, respectively, control the transceiver to receive, from the base station, information for changing a first bandwidth part activated for the terminal to a second bandwidth part, and control the transceiver to receive, from the base station, downlink control information in at least one control resource set corresponding to the second bandwidth part.

According to the aspects of the disclosure, since the method and the apparatus for sharing the resources of the downlink control channel and downlink data channel in the 5G communication system, it is possible to operate the 5G system more efficiently.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
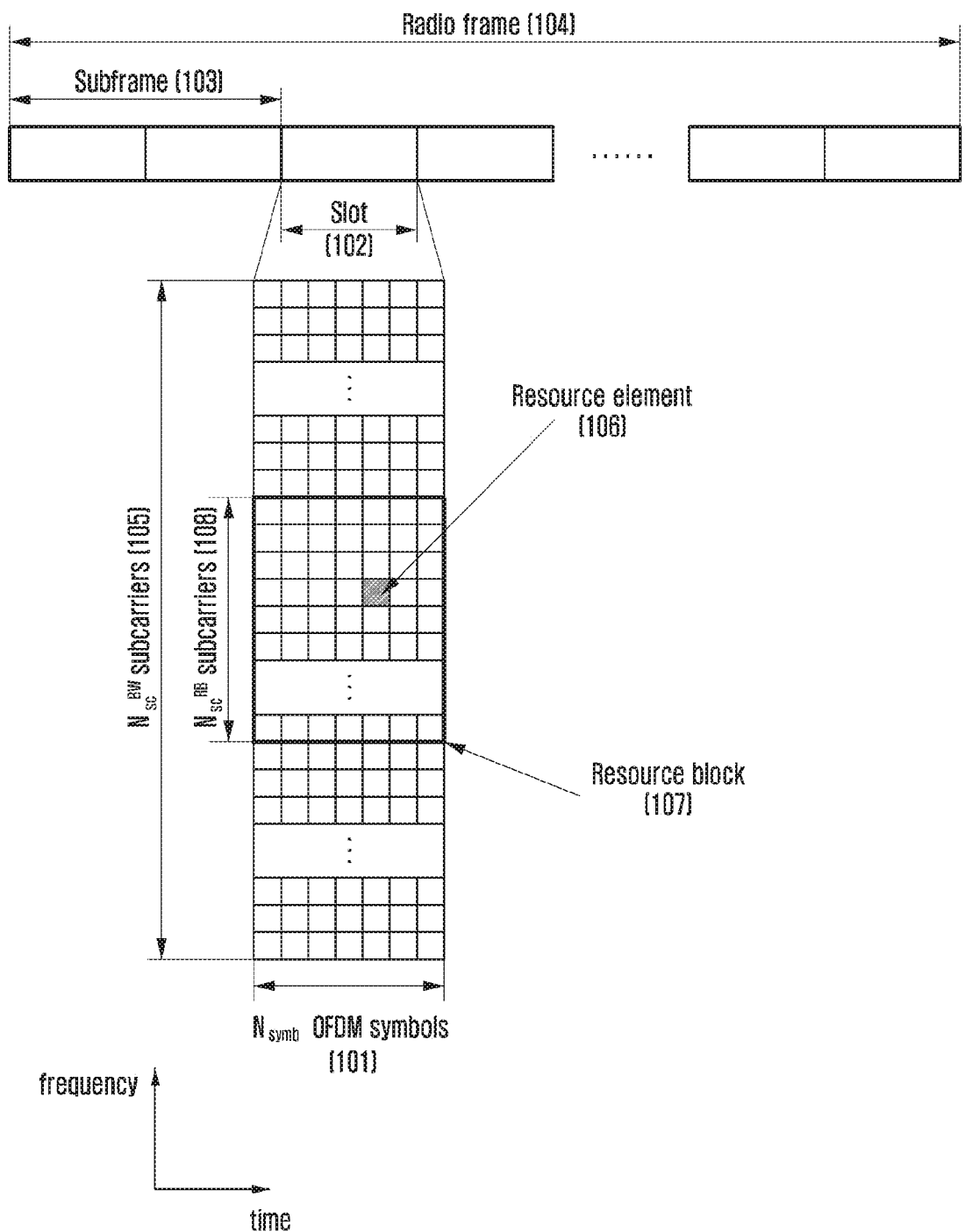
FIG. 1 is a diagram illustrating a basic structure of a time-frequency domain in long term evolution (LTE) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment of the disclosure, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPU)s in a device or a security multimedia card.

A wireless communication system was initially developed for the purpose of providing a voice-oriented service, but has been expanded to, for example, a broadband wireless communication system that provides a high-speed and high-quality packet data service like communication standards, such as third generation partnership project (3GPP) high speed packet access (HSPA), long term evolution (LTE) or evolved universal terrestrial radio access (E-UTRA), LTE-advanced (LTE-A), 3GPP2 high rate packet data (HRPD), ultra-mobile broadband (UMB), and IEEE 802.16e.

In the LTE system that is a representative example of the broadband wireless communication systems, the downlink (DL) adopts an orthogonal frequency division multiplexing (OFDM) scheme, and the uplink (UL) adopts single carrier frequency division multiple access (SC-FDMA) scheme. The uplink means a radio link in which a terminal (or a user equipment (UE)) or a mobile station (MS) transmits data or a control signal to a base station (BS) (or an evolved node B (eNode B)), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

As the post LTE communication system, the 5G communication system should support services that simultaneously satisfy various requirements of users and service providers since it is required to freely reflect the various requirements. Services being considered for the 5G communication system include enhanced mobile broadband (eMBB), massive machine type communication (mMTC), and ultra-reliability low-latency communication (URLLC).

The eMBB aims to provide a more improved data rate than the data rate supported by the existing LTE, LTE-A, or LTE-Pro. For example, in the 5G communication system, the eMBB should provide, from the viewpoint of one base station, the maximum transmission rate of 20 Gbps in the downlink, and the maximum transmission rate of 10 Gbps in the uplink. Further, the 5G communication system should provide the maximum transmission rate and a user perceived data rate of an increased terminal. To satisfy such requirements, it is required to improve various transmission/reception technologies including more improved multi input multi output (MIMO) transmission technology. Further, the current LTE transmits signals using the maximum 20 MHz transmission bandwidth in the 2 GHz band, whereas the 5G communication system uses a wider frequency bandwidth than 20 MHz in the frequency band of 3 to 6 GHz or 6 GHz or more, and thus can satisfy the data rate required in the 5G communication system.

At the same time, the mMTC is under consideration to support application services, such as the Internet of things (IoT), in the 5G communication system. In order to efficiently provide the Internet of things, the mMTC requires massive terminal connection support in a cell, terminal coverage improvement, improved battery time, and terminal cost reduction. Since the Internet of things is attached to several sensors and various devices to provide communication functions, it should support a large number of terminals (e.g., 1,000,000 terminals/km$^2$) in the cell. Further, since there is a high possibility that the terminal supporting the mMTC is located in a shaded area that the cell is unable to cover, such as underground of a building, due to the service characteristics, a wider coverage is required as compared with other services provided in the 5G communication system. The terminal supporting the mMTC should be inexpensive, and requires very long battery life time, such as 10 to 15 years, since it is difficult to frequently replace a battery of the terminal.

Last, the URLLC is a cellular based wireless communication service used for a specific purpose (mission-critical). For example, services used for remote control of a robot or machinery, industrial automation, unmanned aerial vehicle, remote health care, and emergency alert may be considered. Accordingly, the communication provided by the URLLC should provide very low latency and very high reliability.

For example, a service supporting the URLLC should satisfy air interface latency that is shorter than 0.5 ms, and requires a packet error rate of $10^{-5}$ or less at the same time. Accordingly, for the service supporting the URLLC, the 5G system should provide a transmit time interval (TTI) that is smaller than that of other services, and also requires a design to allocate wide resources in the frequency band in order to secure reliability of a communication link.

The three kinds of 5G services, that is, the eMBB, URLLC, and mMTC, may be multiplexed in one system to be transmitted. In this case, in order to satisfy different requirements of the respective services, different transmission/reception techniques and transmission/reception parameters may be used among the services.

Hereinafter, a frame structure of an LTE or LTE-A system will be described with reference to the drawings.

FIG. 1 is a diagram illustrating a basic structure of a time-frequency domain that is a radio resource region on which data or a control channel is transmitted through a downlink in an LTE system according to an embodiment of the disclosure.

Referring to FIG. 1, a horizontal axis represents a time domain, and a vertical axis represents a frequency domain. In the time domain, the minimum transmission unit is an OFDM symbol, and $N_{symb}$ OFDM symbols 101 constitute one slot 102, and two slots constitute one subframe 103. The length of the slot is 0.5 ms, and the length of the subframe is 1.0 ms. Further, a radio frame 104 is a time domain unit composed of 10 subframes.

In the frequency domain, the minimum transmission unit is a subcarrier, and the transmission bandwidth of the whole system is composed of $N_{BW}$ subcarriers 105 in total. In the time-frequency domain, the basic unit of resources is a resource element (RE) 106 that may be expressed by an OFDM symbol index and a subcarrier index. A resource block (RB) (or physical resource block (PRB)) 107 is defined by $N_{symb}$ successive OFDM symbols 101 in the time domain and $N_{RB}$ successive subcarriers 108 in the frequency domain. Accordingly, one RB 107 is composed of $N_{symb} \times N_{RB}$ REs 106. In general, the minimum transmission unit of data is the RB unit. Generally, in the LTE system, $N_{symb}=7$, $N_{RB}=12$, and $N_{BW}$ and $N_{RB}$ are in proportion to the bandwidth of the system transmission band.

Next, downlink control information (DCI) in an LTE or LTE-A system will be described below.

In an LTE system, scheduling information on downlink data or uplink data is transferred from a base station to a terminal through DCI. The DCI defines various formats, and a determined DCI format is applied and operated depending on whether the scheduling information is uplink data scheduling information or downlink data scheduling information, whether the DCI is compact DCI having a small size of control information, whether spatial multiplexing using multiple antennas is applied, or whether the DCI is DCI for power control. For example, DCI format 1 that is the scheduling control information for the downlink data is configured to include at least the following control information.

Resource allocation type 0/1 flag: This notifies whether a resource allocation type is type 0 or type 1. The type 0 allocates resources in the unit of a resource block group (RBG) through applying of a bitmap type. In an LTE system, the basic unit of scheduling is a RB that is expressed as a time and frequency domain resource, and the RBG is composed of a plurality of RBs to be considered as the basic unit of scheduling in the type 0. The type 1 allocates a specific RB in the RBG.

Resource block assignment: This notifies of an RB that is allocated for data transmission. An expressed resource is determined in accordance with the system bandwidth and the resource allocation scheme.

Modulation and coding scheme (MCS): This notifies of a modulation scheme that is used for data transmission and the size of a transport block that is data to be transmitted.

HARQ process number: This notifies of a process number of an HARQ.

New data indicator: This notifies whether HARQ transmission is initial transmission or retransmission.

Redundancy version: This notifies of a redundancy version of the HARQ.

Transmit power control (TPC) command for a physical uplink control channel (PUCCH): This notifies of a transmission power control command for a PUCCH that is an uplink control channel.

The DCI passes through a channel coding and modulation process, and is transmitted through a PUCCH that is a downlink physical control channel or an enhanced PDCCH (EPDCCH).

A cyclic redundancy check (CRC) is attached to a DCI message payload, and the CRC is scrambled by a radio network temporary identifier (RNTI) corresponding to an identity of the terminal. Different RNTIs are used in accordance with the purpose of the DCI message, for example, UE-specific data transmission, power control command, or random access response. For example, the RNTI is not specifically transmitted, but is included in a CRC calculation process to be transmitted.

The terminal having received the DCI message transmitted on the PDCCH identifies the CRC using the allocated RNTI, and if the result of the CRC check is correct, it can be known that the corresponding message has been transmitted to the terminal.

Figure 2:
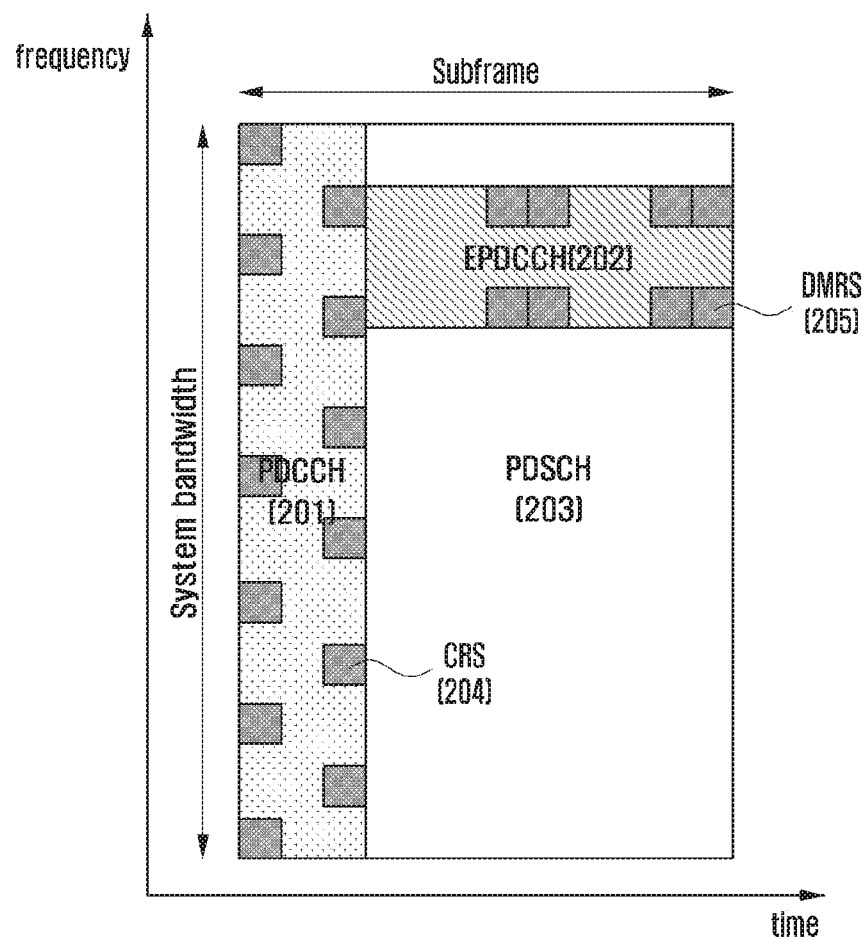
FIG. 2 is a diagram illustrating physical downlink control channel (PDCCH) and enhanced PDCCH (EPDCCH) that are LTE downlink control channels according to various embodiments of the disclosure.

FIG. 2 is a diagram illustrating PDCCH and enhanced PDCCH which are downlink physical channels on which DCI of LTE is transmitted according to an embodiment of the disclosure.

Referring to FIG. 2, a PDCCH 201 is time-multiplexed with a physical downlink shared channel (PDSCH) 203 that is a data transmission channel, and is transmitted over the total system bandwidth. The region of the PDCCH 201 is expressed by the number of OFDM symbols, and is a control format indicator (CFI) transmitted through a physical control format indicator channel (PCFICH) to be indicated by a terminal. By allocating the PDCCH 201 to an OFDM symbol coming to a fore portion of a subframe, the terminal can decode downlink scheduling allocation as fast as possible, and through this, decoding delay for a downlink shared channel (DL-SCH), that is, the overall downlink transmission delay, can be reduced.

Since one PDCCH carries one DCI message and a plurality of terminals can be simultaneously scheduled in a downlink and an uplink, transmission of a plurality of PDCCHs may be simultaneously performed in each cell. As a reference signal for decoding the PDCCH 201, a CRS 204 is used. The CRS 204 is transmitted for each subframe over the full band, and scrambling and resource mapping differ in accordance with a cell identity (ID). Since the CRS 204 is a reference signal commonly used by all terminals, UE-specific beamforming is unable to be used. Accordingly, a multi-antenna transmission technique for the PDCCH of the LTE is limited to open-loop transmission diversity. The number of CRS ports is implicitly known to the terminal from decoding of a physical broadcast channel (PBCH).

Resource allocation of the PDCCH 201 is based on a control-channel element (CCE), and one CCE is composed of 9 resource element groups (REGs), that is, 36 resource elements (REs) in total. The number of CCEs required for a specific PDCCH 201 may be 1, 2, 4, or 8, and this may differ depending on the channel coding rate of the DCI message payload. As described above, the number of different CCEs is used to implement link adaptation of the PDCCH 201.

The terminal should detect a signal in a state where it does not know information on the PDCCH 201, and in an LTE, a search space indicating a set of CCEs for blind decoding has been defined. The search space is composed a plurality of sets at an aggregation level (AL) of each CCE, and it is not specifically signaled, but is implicitly defined through a function by the terminal identity and the subframe number. In each subframe, the terminal performs decoding of the PDCCH 201 with respect to all possible resource candidates that can be made from the CCEs in the configured search space, and processes information declared as valid to the corresponding terminal through the CRC checking.

The search space is classified into a cell-specific search space and a common search space. Terminals of a specific group or all terminals may search the common search space of the PDCCH 201 in order to receive cell-common control information, such as dynamic scheduling of system information or a paging message. For example, scheduling allocation information of the DL-SCH for transmission of system information block (SIB)-1 including enterprise information of a cell may be received by searching the common search space of the PDCCH 201.

Referring to FIG. 2, EPDCCH 202 is frequency-multiplexed with the PDSCH 203 to be transmitted. A base station can properly allocate resources for the EPDCCH 202 and the PDSCH 203 through scheduling, and through this, coexistence with data transmission for the existing LTE terminal can be effectively supported. However, since the EPDCCH 202 is allocated to one subframe as a while on time-axis, a loss occurs from the viewpoint of transmission delay time.

A plurality of EPDCCHs 202 constitute one set of EPDCCHs 202, and allocation of the set of EPDCCHs 202 is performed in the unit of a physical resource block (PRB) pair. Location information for the EPDCCH set is cell-specifically configured, and this is signaled through a radio resource control (RRC). In each terminal, maximally two sets of EPDCCHs 202 may be configured, and one set of EPDCCHs 202 may be configured to be simultaneously multiplexed to different terminals.

Resource allocation of the EPDCCH 202 is based on an enhanced CCE (ECCE), and one ECCE is composed of 4 or 8 enhanced REGs (EREGs), and the number of EREGs for each ECCE differs depending on a CP length and subframe configuration information. One EREG is composed of 9 REs, and thus 16 EREGs may exist per PRB pair.

The EPDCCH transmission type is classified into localized/distributed transmissions. The aggregation level of the ECCE may be 1, 2, 4, 8, 16, and 32, and this is determined by the CP length, subframe configuration, EPDCCH format, and transmission type.

The EPDCCH 202 202 supports only the UE-specific search space. Accordingly, the terminal that intends to receive the system message should necessarily search the common search space on the existing PDCCH 201.

In the EPDCCH 202, a demodulation reference signal (DMRS) 205 is used as a reference signal for decoding. Accordingly, precoding for the EPDCCH 202 may be configured by the base station, and UE-specific beamforming can be used. Even if the terminal does not know what precoding is used, it can perform decoding for the EPDCCH 202 through the DMRS 205. The EPDCCH 202 uses the same pattern as that of the DMRS of the PDSCH 203. However, in contrast with the PDSCH 203, the DMRS 205 of the EPDCCH 202 can support transmission using maximally 4 antenna ports. The DMRS 205 is transmitted only from the corresponding PRB from which the EPDCCH is transmitted.

Port configuration information of the DMRS 205 differs depending on the transmission type of the EPDCCH 202. In the case of a localized transmission type, antenna ports corresponding to the ECCE to which the EPDCCH 202 is mapped are selected based on the ID of the terminal. If different terminals share the same ECCE, that is, if multiuser MIMO transmission is to be used, DMRS antenna ports may be allocated to the respective terminals. Further, DMRS 205 may be shared to be transmitted, and in this case, the DMRS 205 configured through upper layer signaling may be discriminated through a scrambling sequence. In the case of a distributed transmission type, up to two antenna ports of the DMRS 205 are supported, and a precoder cycling type diversity technique is supported. The DMRS 205 may be shared with respect to all REs transmitted in one PRB pair.

As described above, the downlink control channel transmission type in the LTE or LTE-A in the related art and the RS for decoding the same have been described.

Hereinafter, a downlink control channel in the 5G communication system being currently discussed will be described below.

Figure 3:
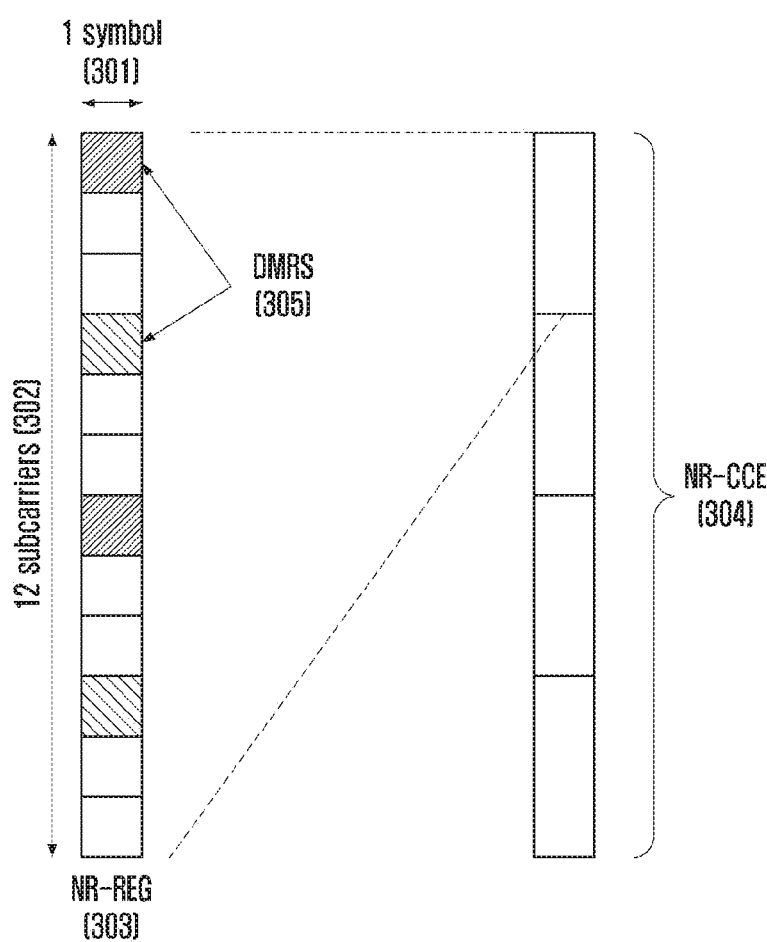
FIG. 3 is a diagram illustrating a fifth generation (5G) downlink control channel according to various embodiments of the disclosure.

FIG. 3 is a diagram illustrating a basic unit of time and frequency resources configuring a downlink control channel that can be used in 5G according to an embodiment of the disclosure.

Referring to FIG. 3, the basic unit of the time and frequency resources configuring the control channel may be called an REG or new radio (NR)-REG. Hereinafter, the basic unit (hereinafter, called NR-REG 303) is composed of 1 OFDM symbol 301 on time axis, and is composed of 12 subcarriers 302, that is, 1 RB, on frequency axis. On the assumption that the time-axis basic unit is 1 OFDM symbol 301 in configuring the basic unit of the control channel, a data channel and a control channel may be time-multiplexed in one subframe. By locating the control channel in front of the data channel, user's processing time can be reduced, and thus it is easy to satisfy the delay time requirements. By configuring the frequency-axis basic unit of the control channel to 1 RB 302, frequency multiplexing between the control channel and the data channel can be performed more efficiently.

A control channel region having various sizes can be configured by concatenating the NR-REG 303 illustrated in FIG. 3. As an example, if it is assumed that the basic unit to which the downlink control channel is allocated in the 5G is an NR-CCE 304, 1 NR-CCE 304 may be composed of a plurality of NR-REGs 303.

Referring to the NR-REG 304 illustrated in FIG. 3 as an example, the NR-REG 303 may be composed of 12 REs, and if 1 NR-CCE 304 is composed of 4 NR-REGs 303, it means that 1 NR-CCE 304 is composed of 48 REs. If a downlink control resource set is configured, the corresponding set may be composed of a plurality of NR-CCEs 304, and a specific downlink control channel may be mapped to one or a plurality of NR-CCEs 304 to be transmitted in accordance with the aggregation level (AL) in the control resource set. The NR-CCEs 304 in the control resource set may be discriminated by numbers, and in this case, the numbers may be given in accordance with a logical mapping type.

The basic unit of the downlink control channel, that is, the NR-REG 303, as illustrated in FIG. 3 may include REs to which the DCI is mapped and a region to which the DMRS 305 that is a reference signal for decoding the REs is mapped in all. In this case, the DMRS 305 may be efficiently transmitted in consideration of an overhead according to an RS allocation. For example, if the downlink control channel is transmitted using a plurality of OFDM symbols, the DMRS 305 may be transmitted only for the first OFDM symbol. The DMRS 305 may be mapped to be transmitted in consideration of the number of antenna ports used to transmit the downlink control channel. FIG. 3 illustrates an example in which two antenna ports are used.

In this case, there may exist the DMRS 306 transmitted for antenna port #0 and a DMRS 307 transmitted for antenna port #1. The DMRSs for different antenna ports may be multiplexed in various manners. FIG. 3 illustrates an example in which the DMRSs corresponding to different antenna ports are orthogonal to each other to be transmitted in different REs. As described above, the DMRSs corresponding to different antenna ports may be transmitted through frequency division multiplexing (FDM), or may be transmitted through code division multiplexing (CDM). In addition, various types of DMRS patterns may exist, and may be related to the number of antenna ports. Hereinafter, the disclosure will be described on the assumption that two antenna ports are used. In the disclosure, the same principle may also be applied to more than two antenna ports.

Figure 4:
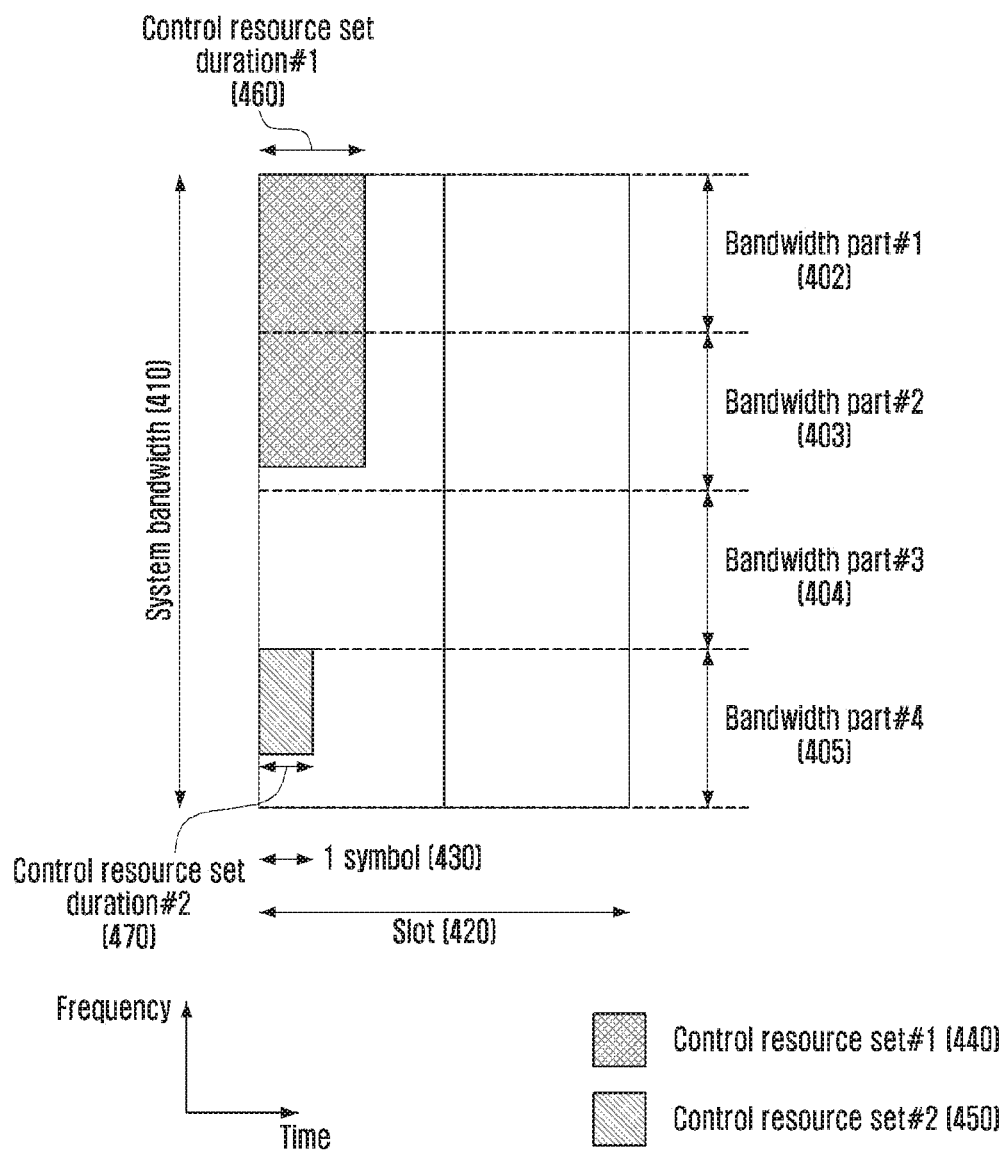
FIG. 4 is a diagram illustrating a method for allocating a control resource set for a 5G downlink control channel; according to various embodiments of the disclosure

FIG. 4 is a diagram illustrating a control resource set on which a downlink control channel is transmitted in a 5G wireless communication system according to an embodiment of the disclosure.

Referring to FIG. 4, a system bandwidth 410 is configured on frequency axis, and 1 slot 420 (in an example of FIG. 4, it is assumed that 1 slot is composed of 7 OFDM symbols) is configured on time axis. The total system bandwidth 410 may be composed of a plurality of bandwidth parts (e.g., 4 bandwidth parts including bandwidth part #1 402, bandwidth part #2 403, bandwidth part #3 404, and bandwidth part #4 405).

FIG. 4 shows an example in which two control resource sets (control resource set #1 440 and control resource set #2 450). The control resource sets 440 and 450 may be configured as specific subbands in the total system bandwidth 410. As an example, in FIG. 4, control resource set #1 410 is configured over bandwidth part #1 402 and bandwidth part #2 403, and control resource set #2 450 is configured at bandwidth part #4 405. On time axis, one or a plurality of OFDM symbols may be configured, and they may be defined as control resource set durations 460 and 470. In an example of FIG. 4, control resource set #1 440 is configured as control resource set duration #1 460 of 2 symbols, and control resource set #2 is configured as control resource set duration #2 470 of 1 symbol 430.

In the 5G, from the viewpoint of a base station, a plurality of control resource sets may be configured in one system. Further, from the viewpoint of a terminal, a plurality of control resource sets may be configured to one terminal. Further, a part of the control resource sets configured in the system may be configured to the terminal. Accordingly, the terminal may not know existence/nonexistence of the specific control resource set existing in the system. As a specific example, two control resource sets of control resource set #1 440 and control resource set #2 450 may be configured in the system of FIG. 4, and control resource set #1 may be configured to terminal #1 while control resource set #1 440 and control resource set #2 450 may be configured to terminal #2. In this case, if no additional indicator exists, terminal #1 may not know the existence/nonexistence of control resource set #2 450.

In the 5G as described above, the control resource set may be configured as a common control resource set, a UE-group common control resource set, or a UE-specific control resource set. The control resource set may be configured to each terminal through UE-specific signaling, UE-group common signaling, or RRC signaling. Configuration of a control resource set to a terminal means providing of information, such as control resource set location, subband, control resource set resource allocation, and control resource set duration. For example, the following information may be included.

TABLE 1

Configuration information 1. Frequency-axis RB allocation information
Configuration information 2. Time-axis control resource set duration (The number of OFDM symbols configured as configured resource set)
Configuration information 3. Resource mapping type (Time-preferential mapping and frequency-preferential mapping)
Configuration information 4. Transmission mode (Localized transmission type and distributed transmission type)
Configuration information 5. Search space type (Common search space, terminal-group search space, and terminal-specific search space)
Configuration information 6. Monitoring occasion (Monitoring period/interval, and monitoring symbol location in slot)
Configuration information 7. DMRS configuration information (DMRS structure and DMRS port number)
- Configuration information 8. REG bundling duration In addition to the above-described configuration information, various pieces of information that is necessary to transmit a downlink control channel may be configured to the terminal.

As described above, the downlink control channel in the 5G communication system being currently discussed has been described. Hereinafter, a method for performing bandwidth adaptation in the 5G communication system being current discussed will be described below.

Figure 5:
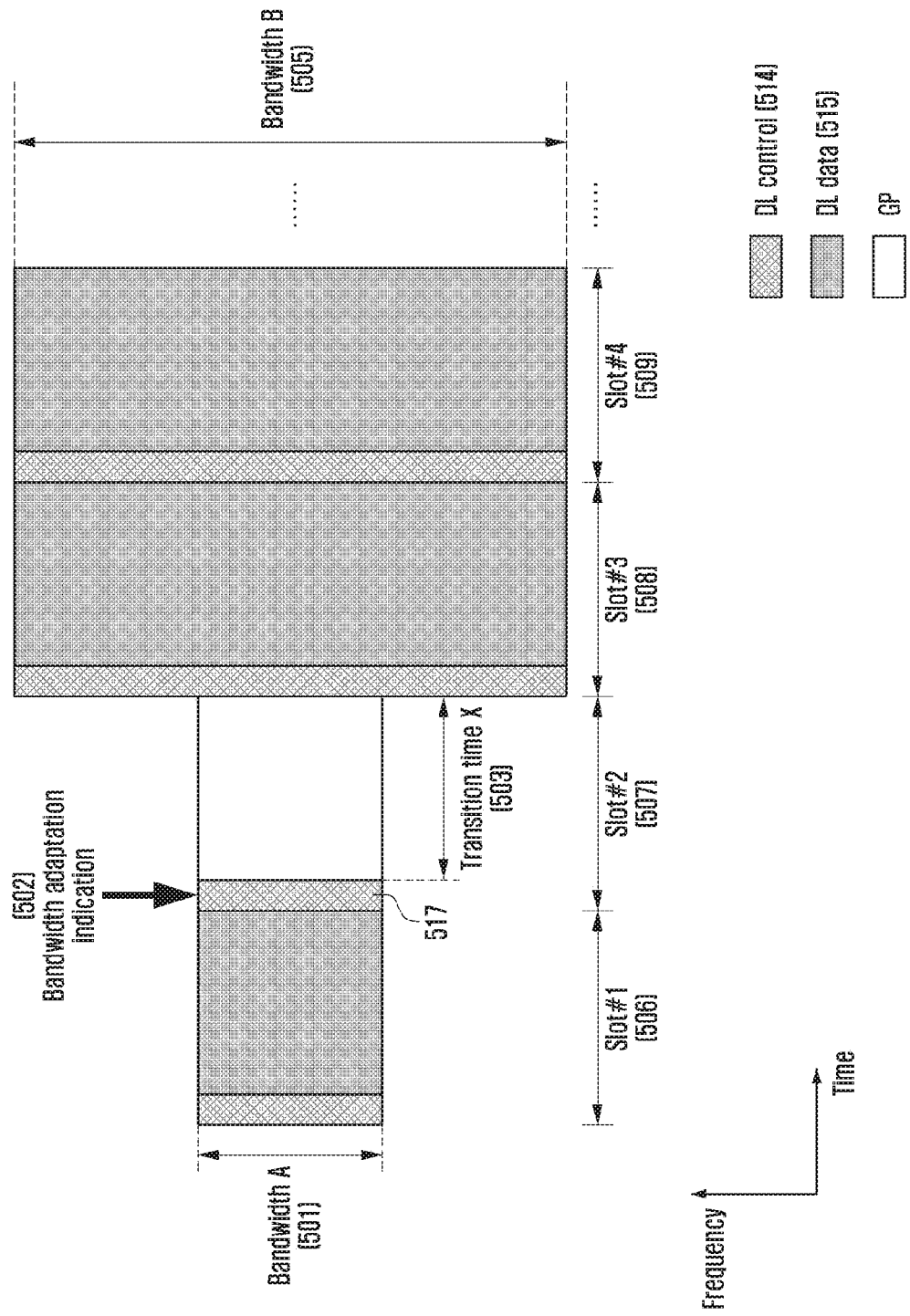
FIG. 5 is a diagram illustrating a bandwidth adaptation operation that is under consideration in 5G according to various embodiments of the disclosure.

FIG. 5 is a diagram a primary concept of the disclosure, efficiently managing terminal power consumption through transmission/reception bandwidth adaptation according to an embodiment of the disclosure.

Referring to FIG. 5, a horizontal axis represents a time domain, and a vertical axis represents a frequency domain. In an example of FIG. 5, a terminal receives from a base station a downlink control channel 514 and a downlink data channel 515 corresponding to the maximum "bandwidth A" 501 in a period of slot #1 506. The bandwidth A may be a predetermined specific reference bandwidth, a bandwidth determined during an initial access of the terminal, or a bandwidth determined through configuration between the terminal and the base station.

In slot #2 507, if the base station instructs the terminal to change the bandwidth of the terminal to "bandwidth B 505" through a "bandwidth adaptation command 502", the terminal having acquired the command executes a bandwidth change operation. The "bandwidth A" and the "bandwidth B" may have different sizes, and the "bandwidth A" may be larger than or smaller than the "bandwidth B". In an example of FIG. 5, it is assumed that the "bandwidth B" is larger than the "bandwidth A". Further, the "bandwidth A" and the "bandwidth B" may be respectively expressed in the unit of a PRB or in the unit of a bandwidth part.

The terminal requires a specific time for successfully receiving the bandwidth adaptation command and acquiring the command through decoding, and requires a specific time for changing the configuration of a terminal RF module during the bandwidth change. In an example of FIG. 5, it is exemplified that the terminal requires the maximum "bandwidth change time X" 503 from reception of the bandwidth adaptation command to completion of the bandwidth change. In an example of FIG. 5, it is exemplified that the "bandwidth adaptation command 502" is included in a downlink control channel 517 to be transmitted to the terminal. Further, during a time period denoted by the reference numeral 503, the terminal does not perform downlink signal reception or uplink signal transmission.

The terminal completes the bandwidth change to the "bandwidth B" in the "bandwidth change time X", and operates in the "bandwidth B" from the period of slot #3 508. Accordingly, the base station may transmit a signal corresponding to the "bandwidth B" to the terminal from the period of slot #3 508. In an example of FIG. 5, the base station transmits to the terminal the downlink control channel 514 and the downlink data channel 515 corresponding to the "bandwidth B" in slot #3 508 and slot #4 509.

The "bandwidth adaptation command 502" may be expressed by minimally 1 bit to maximally N bits (N>1).

"Bandwidth adaptation command" configuration Method 1 (1 bit): If the bandwidth that can be adapted by the terminal includes two kinds of "bandwidth A" and "bandwidth B", the bandwidth that can be adapted by the terminal can be expressed by 1 bit. For example, if the 1-bit information is "0", it means "bandwidth A", whereas if the 1-bit information is "1", it means "bandwidth B".

"Bandwidth adaptation command" configuration Method 2 (N bits): 2N bandwidth that can be adapted by the terminal can be expressed by N bits. For example, if the N bits are 2 bits, "00", "01", "10", and "11" mean "bandwidth A", "bandwidth B", "bandwidth C", and "bandwidth D", respectively.

The base station may transmit the "bandwidth adaptation command 502" to the terminal through at least one method of physical layer signaling, MAC layer signaling, and RRC signaling. Among them, the physical layer signaling is featured so that fast processing of the terminal becomes possible. The base station may individually perform signaling of the "bandwidth adaptation command" to the respective terminals (UE-specific signaling), or may perform common signaling (UE-group common or common signaling) with respect to a plurality of terminals in the cell.

As described above, the method for performing the bandwidth adaptation in the 5G communication system being currently discussed has been described.

As described above, in adapting the transmission/reception bandwidth of the terminal, the terminal may request reconfiguration of the control resource set on which the reconfigured downlink control channel is transmitted. Further, in adapting the bandwidth, the terminal may control the bandwidth or the location of the center frequency in consideration of the preconfigured control resource set. Further, as the terminal operates in a narrow band, it may be necessary for the terminal to perform monitoring of a portion corresponding to a partial frequency band among the preconfigured whole control resource sets. Accordingly, in the disclosure, it is intended to propose a method for efficient control resource set configuration and monitoring of a downlink control channel in an environment in which the transmission/reception bandwidth for the terminal is adapted.

Hereinafter, preferred embodiments of the disclosure will be described with reference to the accompanying drawings. In the accompanying drawings, it is to be noted that the same drawing reference numerals are used for the same elements across various drawings. Further, a detailed description of known functions or configurations will be omitted if it obscures the gist of the disclosure.

Although embodiments of the disclosure will be described as being exemplified through the LTE and 5G systems, they can also be applied to other communication systems having similar technical backgrounds or channel types through slight modifications thereof in a range that does not greatly deviate from the scope of the disclosure by the judgment of those skilled in the art to which the disclosure pertains.

First, an embodiment of a bandwidth adaptation method proposed by the disclosure will be described.

First Embodiment

Figure 6:
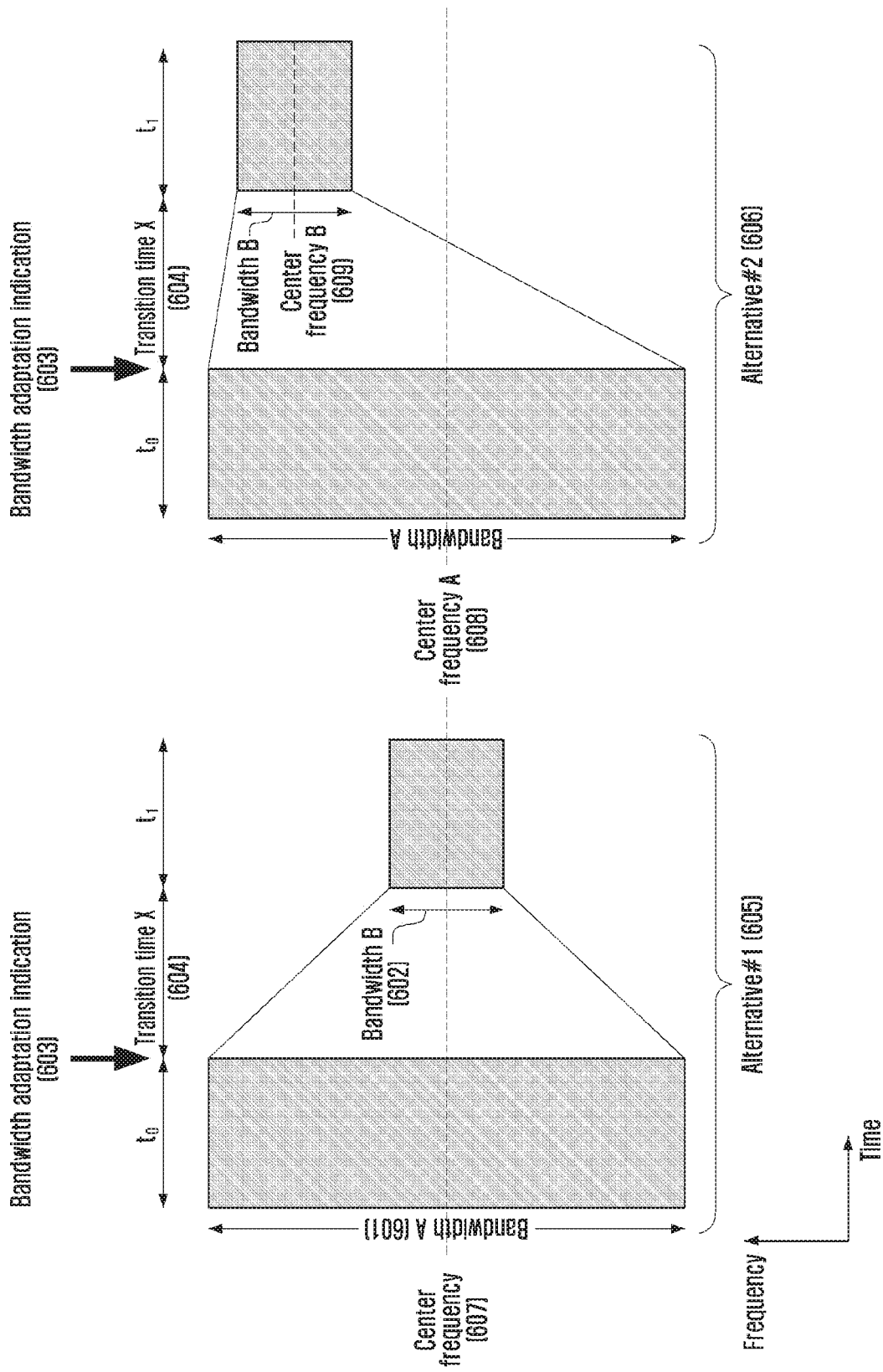
FIG. 6 is a diagram illustrating a first embodiment of the disclosure.

FIG. 6 is a diagram illustrating a bandwidth adaptation method according to a first embodiment of the disclosure.

Referring to FIG. 6, an example is illustrated in which the bandwidth of a terminal is adapted from bandwidth A 601 to bandwidth B 602. The bandwidth adaptation of the terminal may be triggered by a bandwidth adaptation indication 603 transmitted by a base station. The bandwidth adaptation indication 603 may be transmitted by upper layer signaling, for example, radio resource control (RRC) signaling or medium access control (MAC) control element (CE) signaling, or by L1 signaling, for example, DCI. The terminal operating at bandwidth A 601 may start a bandwidth adaptation operation after receiving the bandwidth adaptation indication 603, and may operate at bandwidth B 602 after a bandwidth change time elapses.

(1-1)-th Embodiment

In FIG. 6, alternative #1 605 is a diagram illustrating the (1-1)-th embodiment of the disclosure.

In the (1-1)-th embodiment of the disclosure, the bandwidth adaptation operation of the terminal may be performed to adapt only the size of the bandwidth in a state where the center frequency 607 is the same. Accordingly, the bandwidth adaptation indication 604 may include size information of the bandwidth (e.g., size of bandwidth B) intended to be changed. For example, information on 2N different bandwidth sizes can be indicated using N bits.

Further, the bandwidth size intended to be changed may be configured through upper layer signaling, for example, RRC or MAC CE signaling, and then the change to the corresponding bandwidth size may be indicated by 1 bit through L1 signaling, for example, DCI. Further, 2N bandwidth sizes intended to be changed may be configured through upper layer signaling, for example, RRC or MAC CE signaling, and then the change to the corresponding bandwidth sizes may be indicated by N bits.

Further, the bandwidth size intended to be changed may be indicated in the unit of a preconfigured bandwidth part size. For example, if the size of the bandwidth part is configured to X MHz, the size of bandwidth B 602 may be indicated as M*X MHz, and only information on M may be signaled.

(1-2)-th Embodiment

In FIG. 6, alternative #2 606 is a diagram illustrating the (1-2)-th embodiment of the disclosure.

In the (1-2)-th embodiment of the disclosure, the bandwidth adaptation operation of the terminal may be performed with a certain bandwidth size at a certain frequency location. For example, the bandwidth size before the bandwidth adaptation, for example, bandwidth A 601 and the center frequency, for example, center frequency A 608, may be different from the bandwidth size after the bandwidth adaptation, for example, bandwidth B 602 and the center frequency, for example, center frequency B 609 in all. Accordingly, the bandwidth adaptation indication 604 may include the bandwidth size and center frequency location information intended to be changed.

Further, the bandwidth size and center frequency location intended to be changed may be configured through upper layer signaling, for example, RRC or MAC CE signaling, and then the change of the bandwidth size may be indicated by 1 bit through L1 signaling, for example, DCI. Further, the bandwidth size and center frequency location set (set of 2N size) intended to be changed may be configured through upper layer signaling, for example, RRC or MAC CE signaling, and then the change to a specific configuration in the set may be indicated by N bits through L1 signaling, for example, DCI.

Further, the bandwidth size and location intended to be changed may be indicated by configuration information on the preconfigured bandwidth part. For example, if the size of the bandwidth part in the system band is configured to X MHz, and the number of bandwidths is configured to K, the bandwidth size intended to be changed may be indicated as K*X MHz, and the frequency location intended to be changed may be indicated by an index of the bandwidth part, for example, the k-th bandwidth part.

Further, the bandwidth adaptation operation may be indicated by indicating allocation information on the bandwidth part. For example, if bandwidth A 608 in FIG. 6 corresponds to 4 bandwidth parts, for example, bandwidth part #1, bandwidth part #2, bandwidth part #3, and bandwidth part #4, the bandwidth adaptation operation can be indicated by indicating bandwidth part #2 and bandwidth part #3 as the indication of the bandwidth to be changed through the bandwidth adaptation indication 603.

As described above, the embodiment of the bandwidth adaptation method proposed by the disclosure has been described.

Hereinafter, an embodiment of a method for configuring a control resource set for a downlink control channel in an environment in which the bandwidth is adapted will be described.

Second Embodiment

Figure 7:
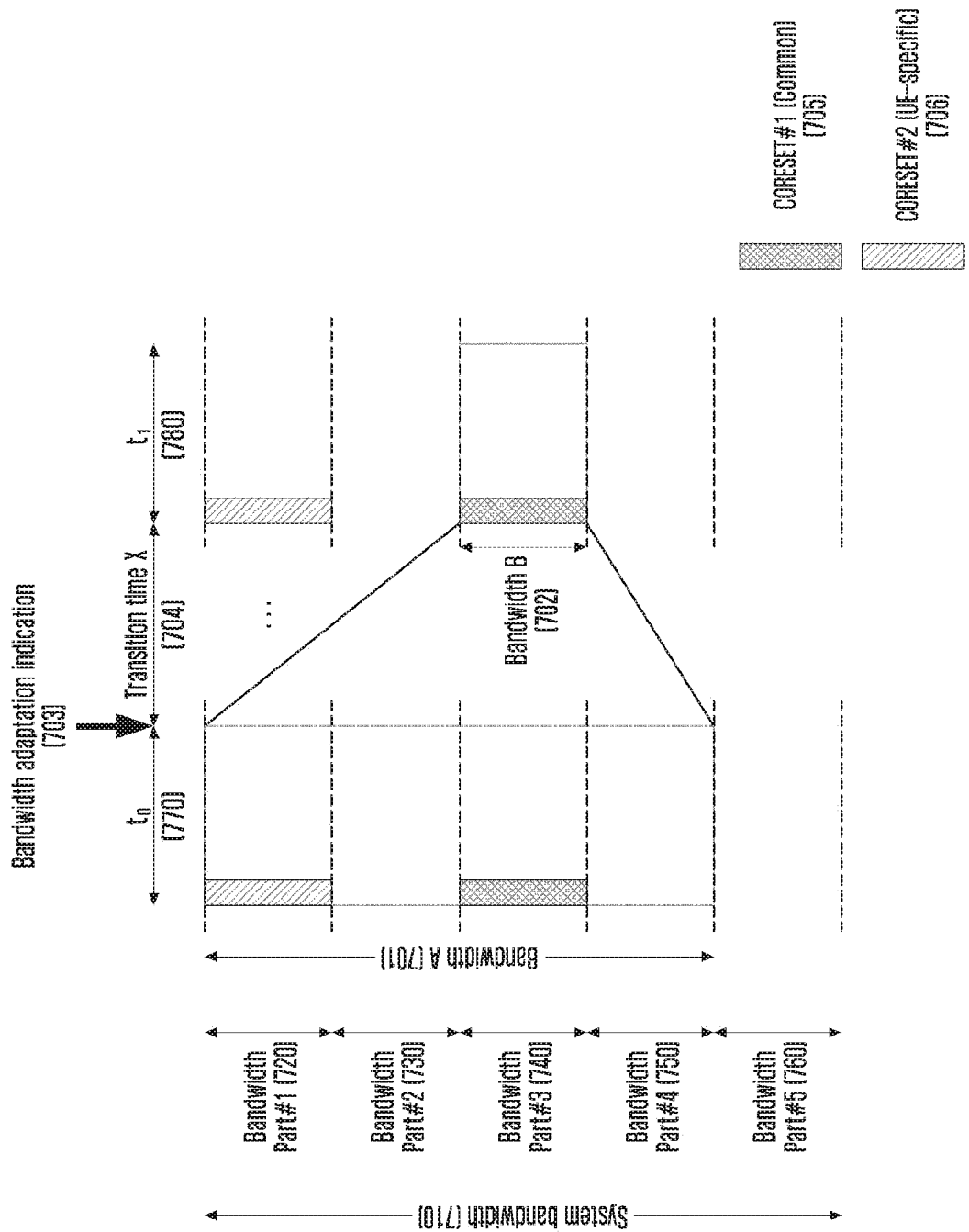
FIG. 7 is a diagram illustrating a second embodiment of the disclosure.

FIG. 7 is a diagram illustrating a bandwidth adaptation method and a method for configuring a control resource set for a downlink control channel according to a second embodiment of the disclosure.

Referring to FIG. 7, an example is illustrated in which the total system bandwidth 710 is composed of 5 bandwidth parts, that is, bandwidth part #1 720, bandwidth part #2 730, bandwidth part #3 740, bandwidth part #4 750, and bandwidth part #5 760, and two control resource sets, that is, control resource set #1 705 and control resource set #2 706, are configured in a terminal.

Each control resource set may be configured to search a specific search space, and for example, a common search space or UE-specific search space may be configured, or both the common search space and the UE-specific search space may be configured. In an example of FIG. 7, the common search space is configured in control resource set #1 705, and the UE-specific search space is configured in control resource set #2. Accordingly, the terminal can perform blind decoding for the common search space in control resource set #1 705, and may receive common control information or UE-specific control information. Further, the terminal can perform blind decoding for the UE-specific search space in control resource set #2 706, and may receive UE-specific control information. In FIG. 7, it is exemplified that the terminal operates at bandwidth A 701 at time t0 770, and receives a bandwidth adaptation indication 703. After a bandwidth change time X 704 elapses, the terminal operates at bandwidth B 780 at time t1 780.

In the second embodiment of the disclosure, if one or a plurality of control resource sets 705 and 706 are preconfigured to the terminal, at least one control resource set configured as the common search space among preconfigured control resource set(s) may be included in the bandwidth after the change when the bandwidth adaptation operation is performed.

More specifically, in FIG. 7, the terminal before the bandwidth adaptation operates at bandwidth A 701, and in the corresponding terminal, control resource set #1 705 to which the common search space is configured and control resource set #2 706 to which the UE-specific search space is configured are configured. In this case, after receiving the bandwidth adaptation indication 703, the terminal may change the bandwidth and frequency location to bandwidth B 702, and in this case, control resource set #1 705 to which the common search space is configured may be included in the bandwidth B 702.

For this, when indicating the bandwidth adaptation to the terminal, the base station may perform the bandwidth adaptation in consideration of frequency allocation information of control resource set #1 705 that is configured to the terminal as the common search space. In an example of FIG. 7, control resource set #1 705 is configured to bandwidth part #3 740, and thus the base station can indicate the bandwidth change to bandwidth part #3 740. Information on the bandwidth adaptation operation and the bandwidth adaptation indication 703 may follow, for example, the (1-1)-th embodiment or the (1-2)-th embodiment of the disclosure as described above.

The terminal may operate at bandwidth B 702 after performing the bandwidth adaptation, and may receive downlink control information, for example, DCI, through control resource set (control resource set #1 705) existing at bandwidth B 702.

In this case, if only the control resource set to which only the common search space is configured exists in the changed bandwidth, the terminal may perform an additional search for the UE-specific search space in the corresponding control resource set although there is not additional configuration for the search space of the corresponding control resource set. For example, in an example of FIG. 7, if the control resource set #1 705 in bandwidth B 702 is configured only for the common search space after the bandwidth adaptation, the terminal may additionally perform blind decoding of the terminal search space in the control resource set #1 705. Accordingly, the base station can also transmit the DCI to the corresponding terminal using not only the common search space of the control resource set #1 705 but also the UE-specific search space.

Further, if the control resource set configured as the UE-specific search space also exists in addition to the control resource set configured as only the common search space in the changed bandwidth, the terminal can use the corresponding control resource set with the original configuration as it is. For example, if both control resource set #1 705 configured as the common search space and control resource set #2 706 configured as the UE-specific search space exist in bandwidth B 702, the terminal may search the common search space in control resource set #1 705 and may search the UE-specific search space in control resource set #2 706 as the original configuration.

Figure 8:
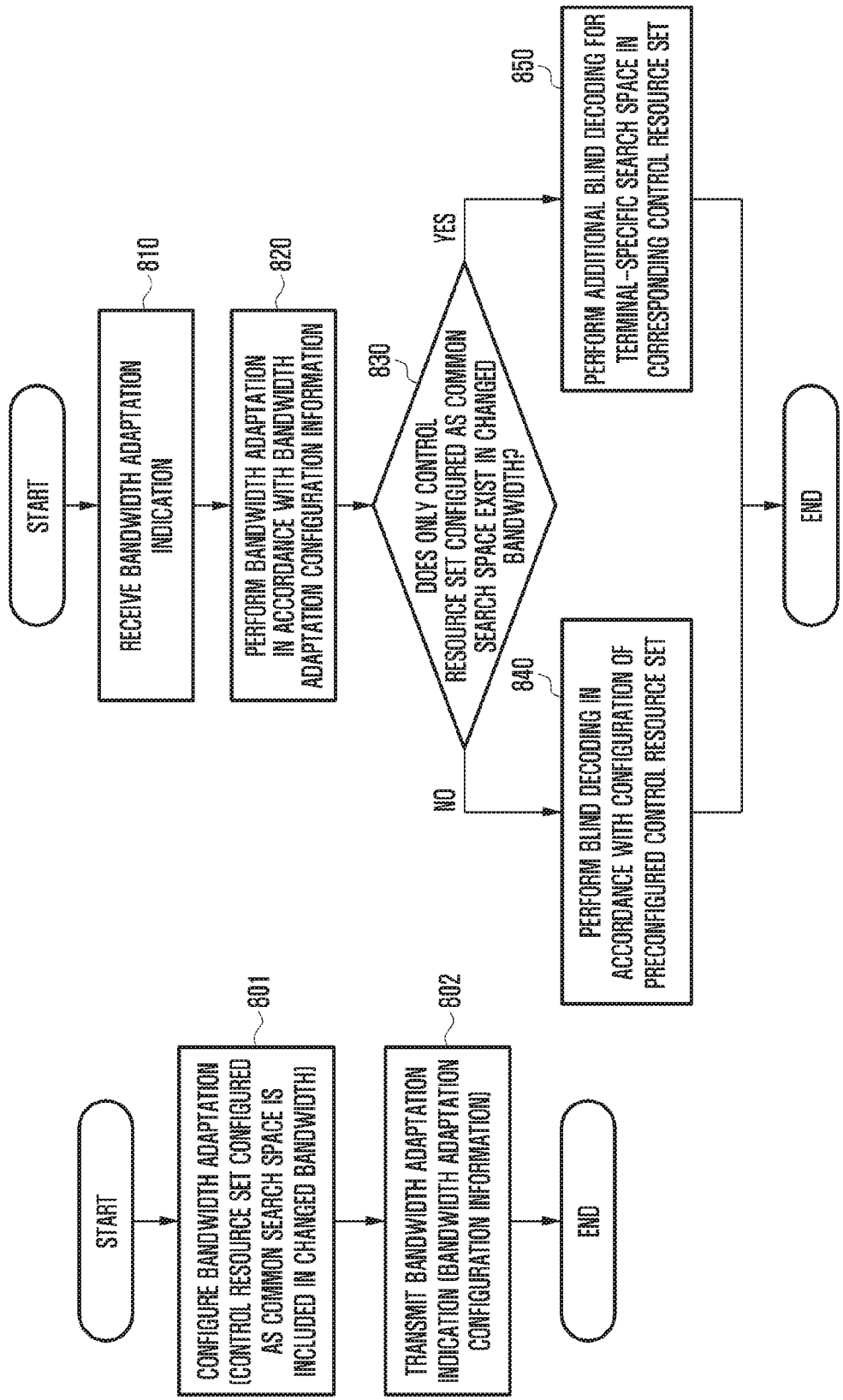
FIG. 8 is a diagram illustrating operations of a base station and a terminal according to a second embodiment of the disclosure.

FIG. 8 is a diagram illustrating base station and terminal procedures according to a second embodiment of the disclosure.

Referring to FIG. 8, first, a base station procedure will be described. At operation 801, the base station may configure the bandwidth adaptation operation with respect to the terminal. In this case, the base station may configure that at least one control resource set is configured as the common search space among control resource sets already configured in the bandwidth after bandwidth adaptation of the terminal. At operation 802, the base station may transmit the bandwidth adaptation indication to the terminal in various methods corresponding to upper layer or L1 signaling or a combination thereof as in the (1-1)-th embodiment and the (1-2)-th embodiment as described above.

Next, a terminal procedure will be described. At operation 810, the terminal may receive the bandwidth adaptation indication from the base station. At operation 820, the terminal may perform the bandwidth adaptation in accordance with the bandwidth adaptation configuration information indicated by the received bandwidth adaptation indication. At operation 830, the terminal may discriminate whether only the control resource set configured as the common search space exists in the changed bandwidth.

If only the control resource set configured as only the common search space exists in the changed bandwidth, the terminal, at operation 850, may perform not only blind decoding for the common search space in the corresponding control resource set but also additional blind decoding for the UE-specific search space. If other control resource sets exist in addition to the control resource set configured as the common search space in the changed bandwidth, the terminal may perform the blind decoding for the corresponding control resource set(s) in accordance with the configuration information for the preconfigured control resource set at operation 840.

(2-1)-th Embodiment

In the (2-1)-th embodiment of the disclosure, if only the control resource set configured as only the common search space exists in the changed bandwidth, the terminal may perform only the common search space in the corresponding control resource set. Accordingly, the terminal can operate based on the configuration information for the preconfigured control resource set.

(2-2)-th Embodiment

In the (2-2)-th embodiment of the disclosure, if only the control resource set configured as only the common search space exists in the changed bandwidth, the base station may determine and indicate to the terminal whether the terminal additionally searches the UE-specific search space in the corresponding control resource set. For example, the base station may indicate to the terminal whether to additionally search the UE-specific search space through L1 signaling of 1 bit, or may semi-statically configure the search through upper layer signaling, for example, RRC or MAC CE signaling.

Third Embodiment

Figure 9:
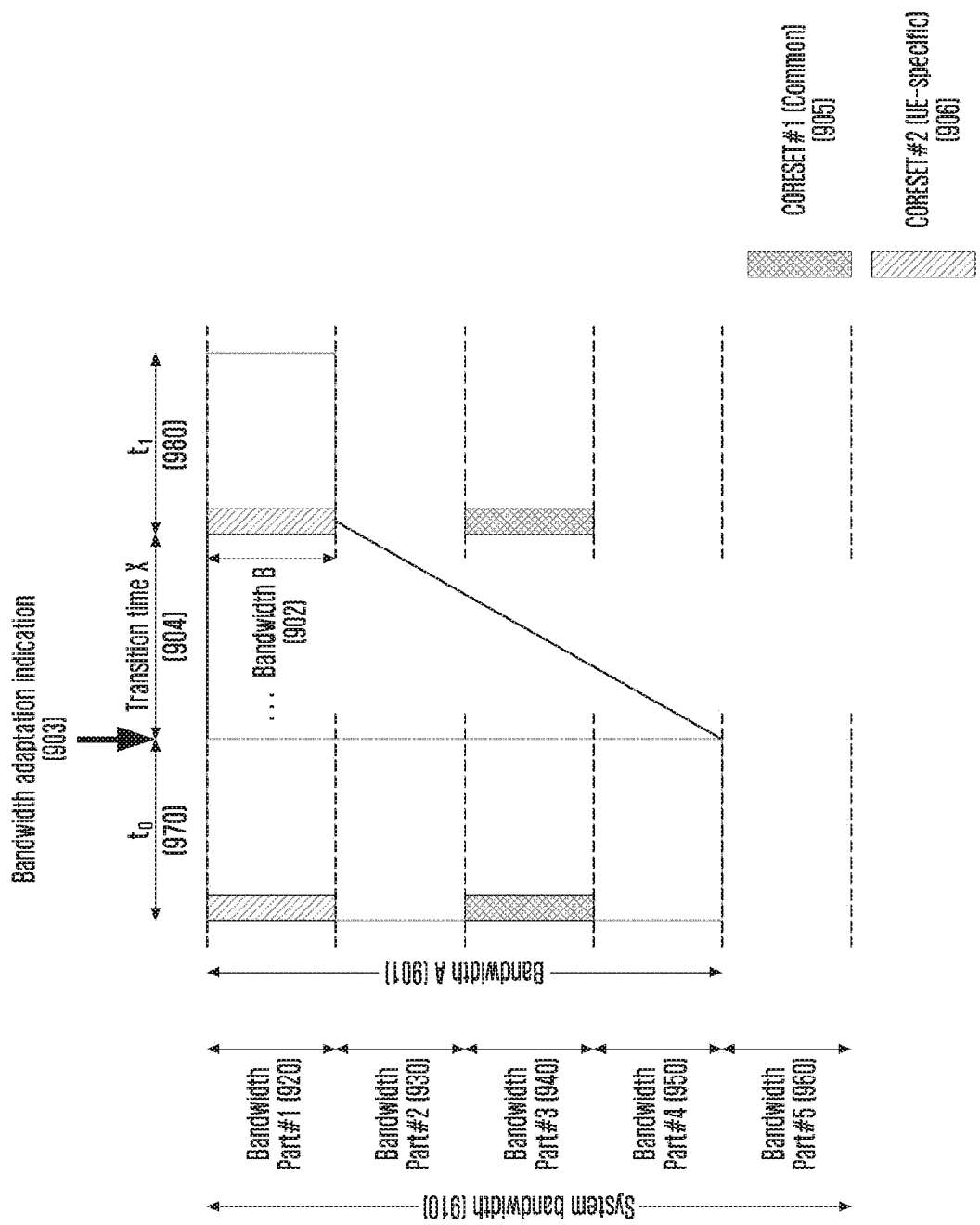
FIG. 9 is a diagram illustrating a third embodiment of the disclosure.

FIG. 9 is a diagram illustrating a bandwidth adaptation method and a method for configuring a control resource set for a downlink control channel according to a third embodiment of the disclosure.

Referring to FIG. 9, an example is illustrated in which the total system bandwidth 910 is composed of 5 bandwidth parts, that is, bandwidth part #1 920, bandwidth part #2 930, bandwidth part #3 940, bandwidth part #4 950, and bandwidth part #5 960, and two control resource sets, that is, control resource set #1 905 and control resource set #2 906, are configured in a terminal. Each control resource set may be configured to search a specific search space, and for example, a common search space or UE-specific search space may be configured, or both the common search space and the UE-specific search space may be configured.

In an example of FIG. 9, the common search space is configured in control resource set #1 905, and the UE-specific search space is configured in control resource set #2 906. Accordingly, the terminal can perform blind decoding for the common search space in control resource set #1 905, and may receive common control information or UE-specific control information. Further, the terminal can perform blind decoding for the UE-specific search space in control resource set #2 906, and may receive UE-specific control information. In FIG. 9, it is exemplified that the terminal operates at bandwidth A 901 at time t0 970, and receives a bandwidth adaptation indication 903. After a bandwidth change time X 904 elapses, the terminal operates at bandwidth B 980 at time t1 980.

In the third embodiment of the disclosure, if one or a plurality of control resource sets 905 and 906 are preconfigured to the terminal, at least one control resource set configured as the UE-specific search space among preconfigured control resource set(s) may be included in the bandwidth after the change when the bandwidth adaptation operation is performed.

More specifically, in FIG. 9, the terminal before the bandwidth adaptation operates at bandwidth A 901, and in the corresponding terminal, control resource set #1 905 to which the common search space is configured and control resource set #2 906 to which the UE-specific search space is configured are configured. In this case, after receiving the bandwidth adaptation indication 903, the terminal may change the bandwidth and frequency location to bandwidth B 902, and in this case, control resource set #1 905 to which the UE-specific search space is configured may be included in the bandwidth B 902. For this, when indicating the bandwidth adaptation to the terminal, the base station may perform the bandwidth adaptation in consideration of frequency allocation information of control resource set #1 905 that is configured to the terminal as the UE-specific search space.

In an example of FIG. 9, control resource set #2 906 is configured to bandwidth part #1 920, and thus the base station can indicate the bandwidth change to bandwidth part #1 920. Information on the bandwidth adaptation operation and the bandwidth adaptation indication 903 may follow, for example, the (1-1)-th embodiment or the (1-2)-th embodiment of the disclosure as described above.

The terminal may operate at bandwidth B 902 after performing the bandwidth adaptation, and may receive downlink control information, for example, DCI, through a control resource set (control resource set #2 906) existing at bandwidth B 902.

In this case, if only the control resource set to which only the UE-specific search space is configured exists in the changed bandwidth, the terminal may perform an additional search for the common search space in the corresponding control resource set although there is not additional configuration for the search space of the corresponding control resource set. For example, in an example of FIG. 9, if the control resource set #2 906 in bandwidth B 902 is configured only for the UE-specific search space after the bandwidth adaptation, the terminal may additionally perform blind decoding of the common search space in the control resource set #2 906, Accordingly, the base station can also transmit the DCI (including both the common DCI and the UE-specific DCI) to the corresponding terminal using not only the common search space of the control resource set #2 906 but also the UE-specific search space.

Further, if the control resource set configured as the common search space also exists in addition to the control resource set configured as only the UE-specific search space in the changed bandwidth, the terminal can use the corresponding control resource set with the original configuration as it is. For example, if both control resource set #1 905 configured as the common search space and control resource set #2 906 configured as the UE-specific search space exist in bandwidth B 902, the terminal may search the common search space in control resource set #1 905 and may search the UE-specific search space in control resource set #2 906 as the original configuration.

Figure 10:
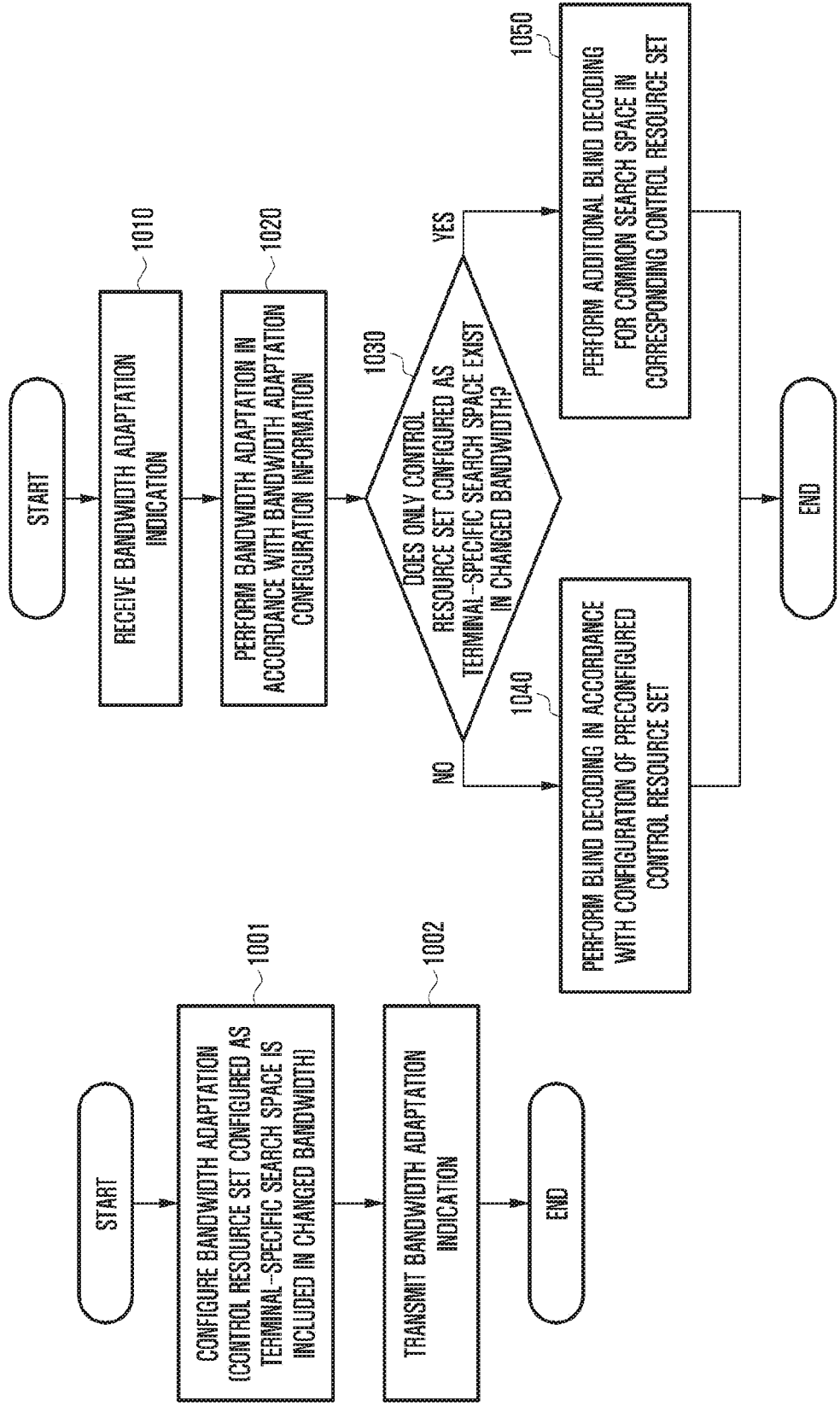
FIG. 10 is a diagram illustrating operations of a base station and a terminal according to a third embodiment of the disclosure.

FIG. 10 is a diagram illustrating base station and terminal procedures according to a third embodiment of the disclosure.

Referring to FIG. 10, first, a base station procedure will be described. At operation 1001, the base station may configure the bandwidth adaptation operation with respect to the terminal. In this case, the base station may configure that at least one control resource set is configured as the UE-specific search space among control resource sets already configured in the bandwidth after bandwidth adaptation of the terminal. At operation 1002, the base station may transmit the bandwidth adaptation indication to the terminal in various methods corresponding to upper layer or L1 signaling or a combination thereof as in the (1-1)-th embodiment and the (1-2)-th embodiment as described above.

Next, a terminal procedure will be described. At operation 1010, the terminal may receive the bandwidth adaptation indication from the base station. At operation 1020, the terminal may perform the bandwidth adaptation in accordance with the bandwidth adaptation configuration information indicated by the received bandwidth adaptation indication. At operation 1030, the terminal may discriminate whether only the control resource set configured as the UE-specific search space exists in the changed bandwidth.

If only the control resource set configured as only the UE-specific search space exists in the changed bandwidth, the terminal, at operation 1050, may perform not only blind decoding for the UE-specific search space in the corresponding control resource set but also additional blind decoding for the common search space. If other control resource sets configured as the common search space exist in addition to the control resource set configured as the UE-specific search space in the changed bandwidth, the terminal may perform the blind decoding for the corresponding control resource set(s) in accordance with the configuration information for the preconfigured control resource set at operation 1040.

(3-1)-th Embodiment

In the (3-1)-th embodiment of the disclosure, if only the control resource set configured as only the UE-specific search space exists in the changed bandwidth, the base station may transmit common DCI to the corresponding terminal as the UE-specific search space, and the terminal may perform additional decoding for a DCI format corresponding to the common DCI in the corresponding control resource set.

(3-2)-th Embodiment

In the (3-2)-th embodiment of the disclosure, if only the control resource set configured as only the UE-specific search space exists in the changed bandwidth, the base station may determine and indicate to the terminal whether the terminal additionally searches the common search space in the corresponding control resource set. For example, the base station may indicate to the terminal whether to additionally search the common search space through L1 signaling of 1 bit, or may semi-statically configure the search through upper layer signaling, for example, RRC or MAC CE signaling.

Fourth Embodiment

Figure 11:
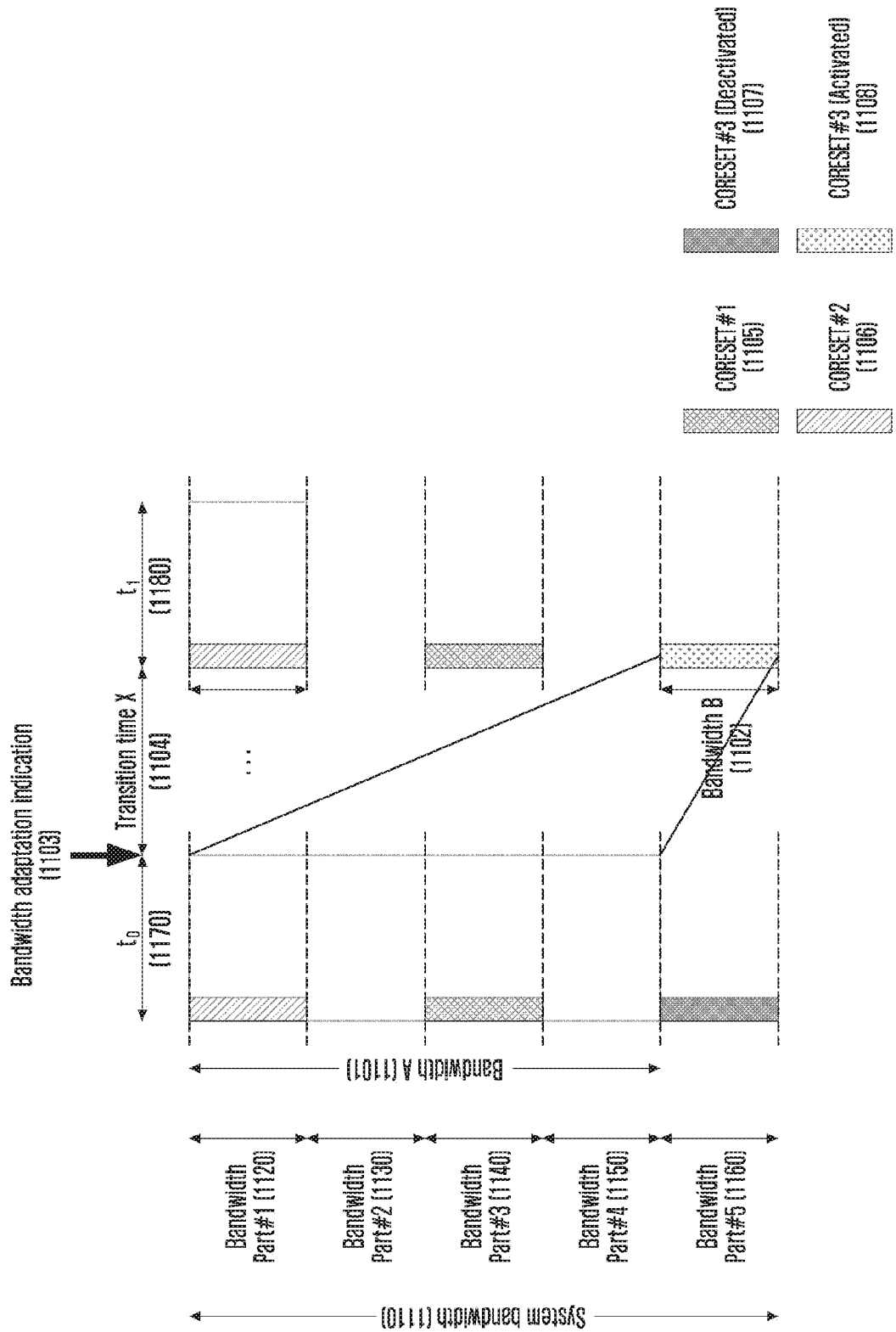
FIG. 11 is a diagram illustrating a fourth embodiment of the disclosure.

FIG. 11 is a diagram illustrating a bandwidth adaptation method and a method for configuring a control resource set for a downlink control channel according to a fourth embodiment of the disclosure.

Referring to FIG. 11, an example is illustrated in which the total system bandwidth 1110 is composed of 5 bandwidth parts, that is, bandwidth part #1 1120, bandwidth part #2 1130, bandwidth part #3 1140, bandwidth part #4 1150, and bandwidth part #5 1160, and three control resource sets, that is, control resource set #1 1105, control resource set #2 1106, and control resource set #3 1107, are configured in a terminal.

Among three control resource sets, it is exemplified that control resource set #1 1105 and control resource set #2 1106 are in a state (activated control resource set) where the terminal is configured to perform monitoring in order to receive the downlink control channel, and control resource set #3 1107 notifies the terminal of only configuration information (e.g., configuration information described in table 1 as described above), but it is actually in a state (i.e., a deactivated state) where monitoring is not performed.

For various purposes, a base station may configure unused (deactivated) control resource set #3 1107 to the terminal. As an example, for the purpose of notifying the terminal of a start symbol point of a data channel in a frequency domain in which control resource set #3 1107 exists, the base station may notify the corresponding terminal of configuration information of control resource set #3 1107. As another example, during the bandwidth adaptation being considered in the disclosure, the base station may configure the configuration information to the terminal in order to minimize signaling for additional configuration of the control resource set. In FIG. 11, the terminal may receive downlink control information, for example, DCI, through control resource set #1 1105 and control resource set #2 1106 before a bandwidth change (at time t0 1170). FIG. 11 illustrates an example in which the terminal operates at bandwidth A 1101 at time t0 1170, receives bandwidth adaptation indication 1103, and operates at bandwidth B 1180 at time t1 1180 after a bandwidth change time X 1104 elapses.

In the fourth embodiment of the disclosure, if one or a plurality of control resource sets 1105, 1106, and 1107 are preconfigured to the terminal, at least one control resource set among control resource sets may be included in the bandwidth after the change in case where the bandwidth adaptation operation is performed. In this case, if the deactivated control resource set among the control resource sets exists in the changed bandwidth, the base station may notify the terminal whether to activate the corresponding control resource set through the indication. If the activation indication for the deactivated control resource set is received, the terminal may activate the corresponding control resource set and may perform monitoring of the corresponding control resource set.

This will be described with reference to FIG. 11. Referring to FIG. 11, the terminal before the bandwidth adaptation operates at bandwidth A 1101, and activated control resource set #1 1105 and control resource set #2 1106, and deactivated control resource set #3 1107 are configured to the corresponding terminal. In this case, after receiving the bandwidth adaptation indication 1103, the terminal may change the bandwidth and frequency location to bandwidth B 1102. In this case, at least one control resource set may be included in bandwidth B 1102, and in an example of FIG. 11, deactivated control resource set #3 1108 may be included.

In an example of FIG. 11, control resource set #3 1107 is configured to bandwidth part #5 1160, and thus the base station may indicate the bandwidth change to bandwidth part #5 1160. Information on the bandwidth adaptation operation and the bandwidth adaptation indication 1103 may follow, for example, the (1-1)-th embodiment or the (1-2)-th embodiment of the disclosure as described above.

In this case, with respect to deactivated control resource set #3 1107 existing in the changed bandwidth, the base station may configure control resource set #3 activated through the activation indication to the terminal. Accordingly, the base station can transmit the downlink control information to the corresponding terminal through control resource set #3 after the change (at time t1 1180), and the terminal can receive the transmitted downlink control information by monitoring control resource set #3 1108.

It may be configured in various methods whether to activate the deactivated control resource set after the bandwidth adaptation. For example, it may be dynamically configured to match the time when the bandwidth adaptation is performed using L1 signaling (e.g., DCI). Further, it may be preconfigured at a time before the bandwidth adaptation is performed through upper layer signaling (e.g., RRC or MAC CE). In this case, if the bandwidth adaptation is configured to a frequency band in which a specific deactivated control resource set exists, the terminal may determine whether to activate the corresponding control resource set in accordance with preconfigured activation configuration.

After the bandwidth adaptation, one or a plurality of deactivated control resource sets may exist in the bandwidth. If a plurality of deactivated control resource sets exist, the base station can determine what control resource set the base station activates, and this can be indicated through L1 signaling (e.g., N-bit DCI indication) or upper layer signaling as described above.

Figure 12:
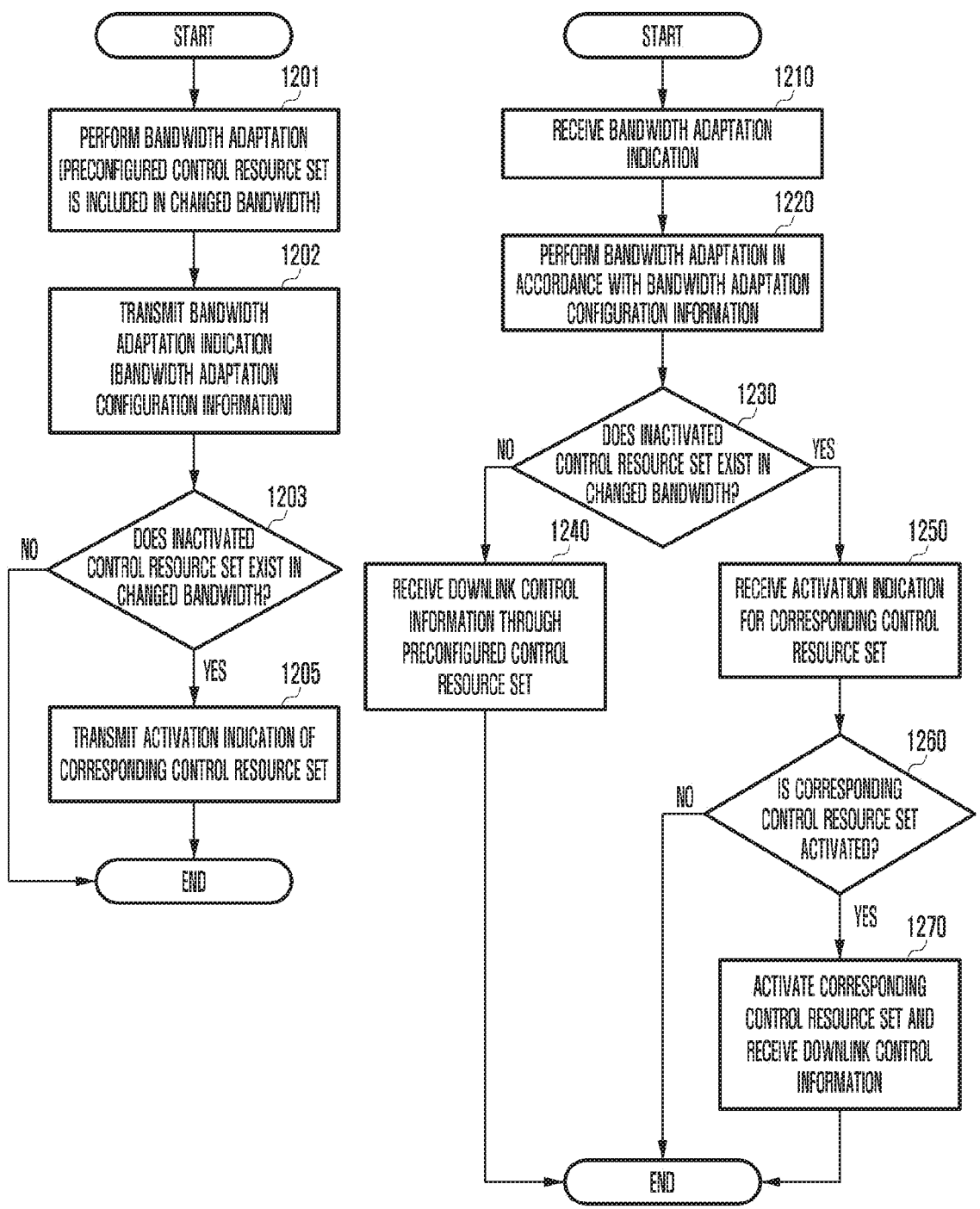
FIG. 12 is a diagram illustrating operations of a base station and a terminal according to a fourth embodiment of the disclosure.

FIG. 12 is a diagram illustrating base station and terminal procedures according to a fourth embodiment of the disclosure.

Referring to FIG. 12, first, a base station procedure will be described. At operation 1201, the base station may configure the bandwidth adaptation operation with respect to the terminal. In this case, the base station may configure that at least one of preconfigured control resource sets is included in the bandwidth after the bandwidth adaptation of the terminal. At operation 1202, the base station may transmit the bandwidth adaptation indication to the terminal in various methods corresponding to upper layer or L1 signaling or a combination thereof as in the (1-1)-th embodiment and the (1-2)-th embodiment as described above.

At operation 1203, the base station may determine whether deactivated control resource set exists in the changed bandwidth. If the deactivated control resource set exists, the base station, at operation 1205, may additionally transmit the indication indicating whether to activate the corresponding control resource set.

Next, a terminal procedure will be described. At operation 1210, the terminal may receive the bandwidth adaptation indication from the base station. At operation 1220, the terminal may perform the bandwidth adaptation in accordance with the bandwidth adaptation configuration information indicated by the received bandwidth adaptation indication. At operation 1230, the terminal may discriminate whether deactivated control resource set exists in the changed bandwidth.

If the deactivated control resource set exists in the changed bandwidth, the terminal, at operation 1250, may additionally receive an indication indicating activation/deactivation of the corresponding control resource set. At operation 1260, the terminal may determine the activation/deactivation of the corresponding control resource set from the indication, and if it is indicated to activate the corresponding control resource set, the terminal, at operation 1270, may activate the corresponding control resource set and may perform monitoring. If it is determined that deactivated control resource set does not exist in the changed bandwidth at operation 1230, the terminal, at operation 1240, may perform monitoring of the corresponding control resource set in accordance with the configuration of the preconfigured control resource set.

Fifth Embodiment

Figure 13:
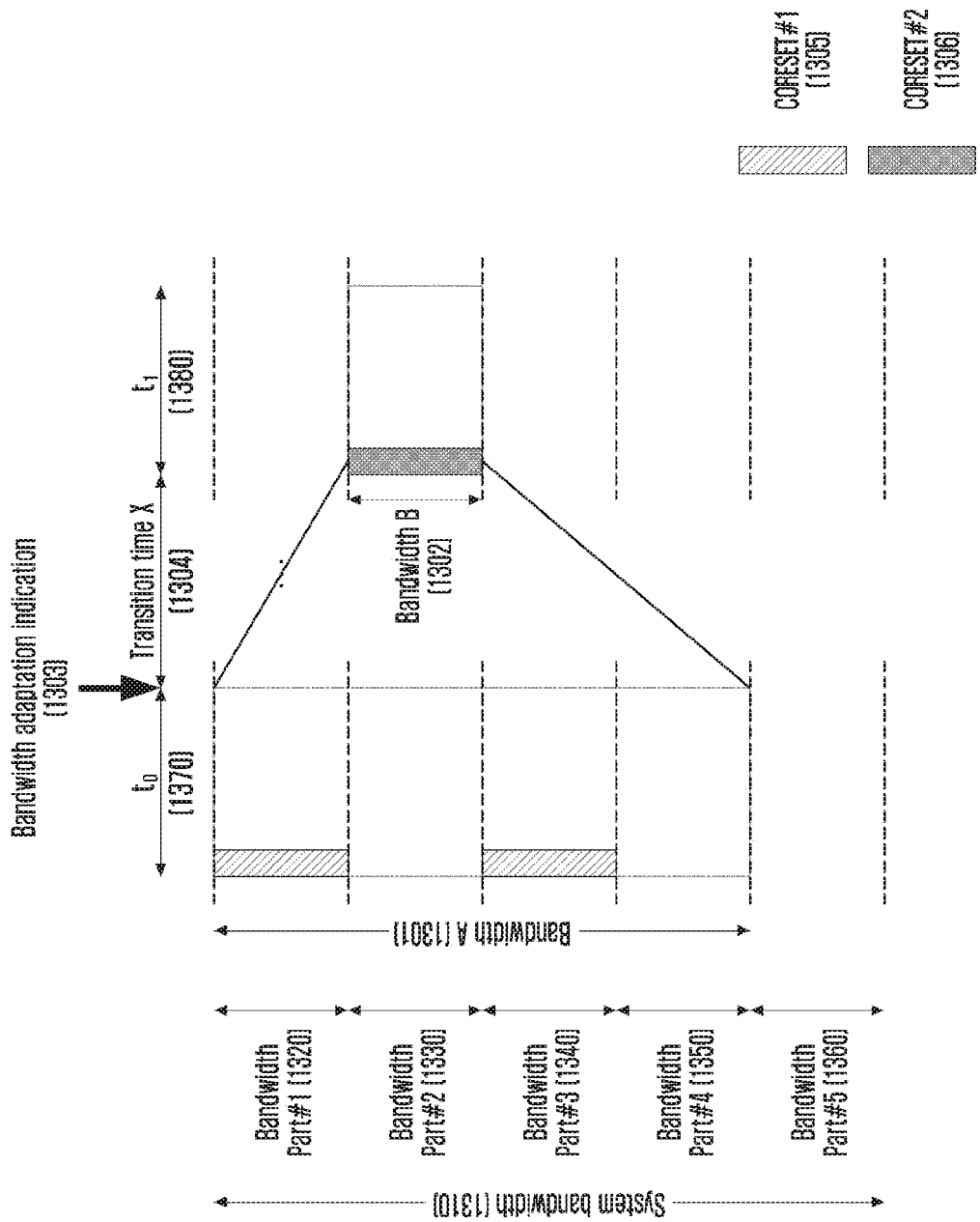
FIG. 13 is a diagram illustrating a fifth embodiment of the disclosure.

FIG. 13 is a diagram illustrating a bandwidth adaptation method and a method for configuring a control resource set for a downlink control channel according to a fifth embodiment of the disclosure.

Referring to FIG. 13, an example is illustrated in which the total system bandwidth 1310 is composed of 5 bandwidth parts, that is, bandwidth part #1 1320, bandwidth part #2 1330, bandwidth part #3 1340, bandwidth part #4 1350, and bandwidth part #5 1360, and a specific control resource set #1 1305 is configured in a terminal. The terminal may receive downlink control information, for example, DCI, through control resource set #1 1305 before bandwidth change (at time $t_0$ 1370).

FIG. 13 illustrates an example in which the terminal operates at bandwidth A 1301 at time $t_0$ 1370, and receives a bandwidth adaptation indication 1303. After a bandwidth change time X 1304 elapses, the terminal operates at bandwidth B 1302 at time $t_1$ 1380.

In the fifth embodiment of the disclosure, after a bandwidth adaptation operation, the base station may configure a new control resource set to the terminal in the changed bandwidth. This will be described below with reference to FIG. 13.

Referring to FIG. 13, after receiving the bandwidth adaptation indication 1303, the terminal may change the bandwidth and frequency location to bandwidth B 1302, and in this case, it may configure a new control resource set (control resource set #2 1306 in FIG. 13) in bandwidth B 1302. Control resource set #2 1306 may be configured based on various pieces of configuration information that may be considered in configuring the existing control resource set, and this may include information described in table 1 as described above.

Further, in configuring the new control resource set #2 1306 in the changed bandwidth, only a part of the above-described configuration information may be configured. In this case, the remaining parameters that have not been additionally configured may follow the configuration information of control resource set #1 1305 preconfigured before the bandwidth adaptation as it is. In other words, partial configuration information of control resource set #2 1306 may be equal to partial configuration information of control resource set #1 1305. For example, only configuration information 1 and configuration information 2 in Table 2 as described above may be used as configuration information for configuring control resource set #2 1306, and the remaining configuration information may be equal to the configuration information of control resource set #1 1305.

In performing the fifth embodiment of the disclosure, configuration of the control resource set in the changed bandwidth after the bandwidth adaptation may be performed through various signaling types. For example, the control resource set may be dynamically configured to the terminal through L1 signaling, for example, DCI, to match the time when the bandwidth adaptation is performed. Further, the control resource set may be semi-statically preconfigured at the time before the bandwidth adaptation is performed through upper layer signaling (e.g., RRC or MAC CE).

Further, the control resource set may be configured through a combination of L1 signaling and upper layer signaling. For example, the base station may semi-statically configure a candidate group for one or a plurality of new control resource sets to perform monitoring after the bandwidth adaptation through upper layer signaling. Thereafter, the base station may dynamically configure the use of one or a plurality of candidates for the new control resource sets configured at the time when the bandwidth adaptation is performed through L1 signaling.

Specifically, the base station may pre-notify the terminal of configuration information on a set of candidates for the control resource sets to be used after the bandwidth change, for example, a set of control resource sets composed of N control resource sets, {control resource set #1, control resource set #2, control resource set #3, . . . , control resource set #N} through upper layer signaling (RRC or MAC CE signaling), and may notify the terminal of an indication for using a specific control resource set in the set of control resource sets (e.g., indication for using {control resource set #2}) through L1 signaling using one or a plurality of bits (e.g., N bits or $\log_2(N)$ bits) when the bandwidth adaptation is performed.

Figure 14:
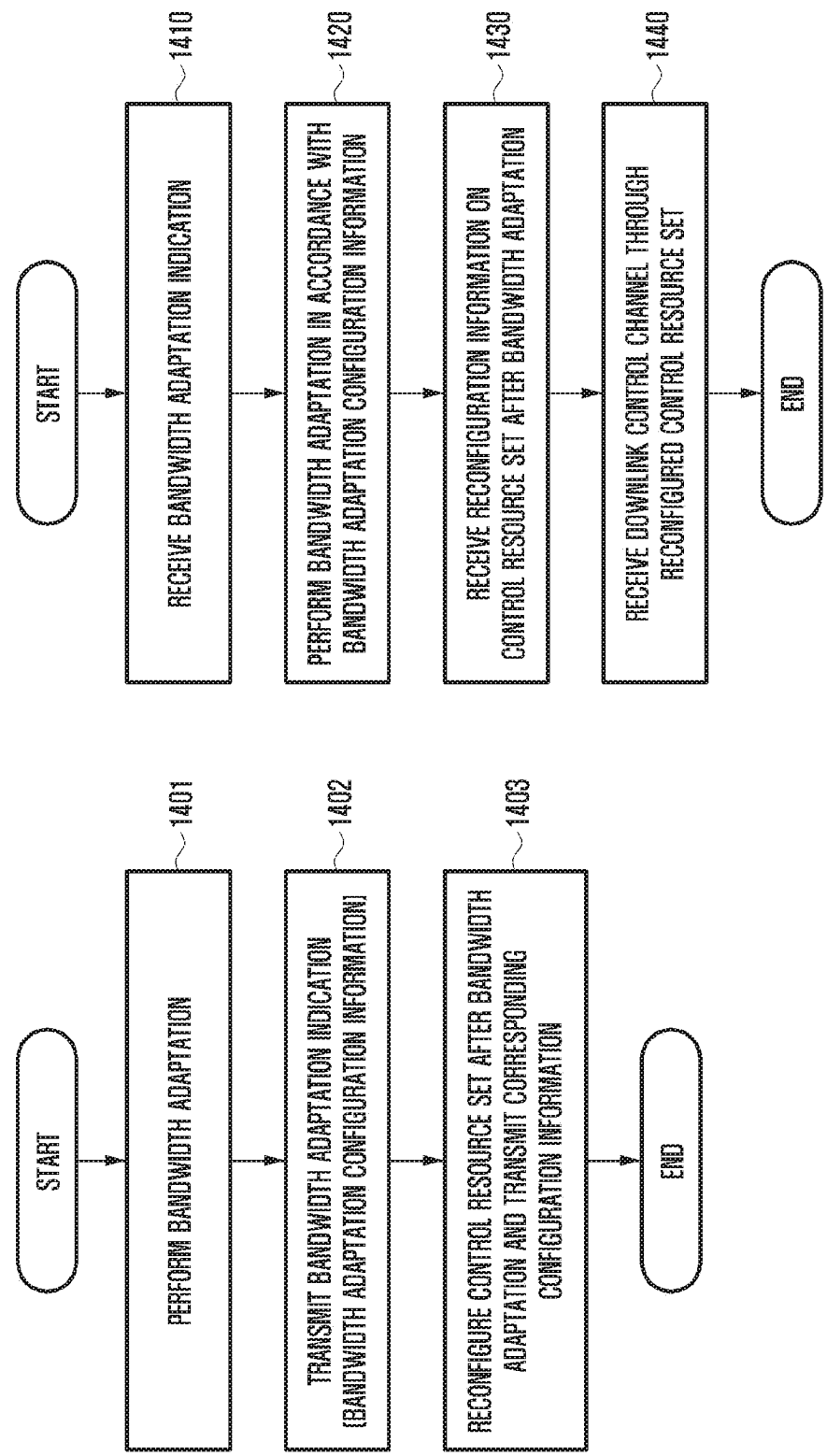
FIG. 14 is a diagram illustrating operations of a base station and a terminal according to a fifth embodiment of the disclosure.

FIG. 14 is a diagram illustrating base station and terminal procedures according to a fifth embodiment of the disclosure.

Referring to FIG. 14, first, a base station procedure will be described. At operation 1401, the base station may configure the bandwidth adaptation operation with respect to a terminal. At operation 1402, the base station may transmit a bandwidth adaptation indication to the terminal in various methods corresponding to upper layer or L1 signaling or a combination thereof as in the (1-1)-th embodiment and the (1-2)-th embodiment as described above.

At operation 1403, the base station may configure a new control resource set in the changed bandwidth after bandwidth adaptation, and may transmit corresponding configuration information to the terminal. Configuration of the new control resource set in the changed bandwidth may be performed in various methods in the fifth embodiment.

Next, a terminal procedure will be described. At operation 1410, the terminal may receive the bandwidth adaptation indication from the base station. At operation 1420, the terminal may perform the bandwidth adaptation in accordance with the bandwidth adaptation configuration information indicated by the received bandwidth adaptation indication. At operation 1430, the terminal may receive configuration information for the control resource set in the changed bandwidth after the bandwidth adaptation. At operation 1440, the terminal may receive a downlink control channel through the reconfigured control resource set.

(5-1)-th Embodiment

In the (5-1)-th embodiment of the disclosure, in configuring the control resource set in the changed bandwidth after performing the bandwidth adaptation operation, a predefined control resource set (CORESET) that can be expressed by a function of various system parameters may be used without additional configuration from the base station. In the disclosure, this is called a sub-control resource set. The configuration information for the sub-control resource set may include a part or the whole of the configuration information provided in Table 1, and this may be determined by bandwidth configuration intended to be changed through the bandwidth adaptation. For example, if it is assumed that the bandwidth adaptation from bandwidth A to bandwidth B is performed, the control resource set at bandwidth A may be configured in the same method as the existing method through upper layer signaling, for example, RRC signaling, and the control resource set at bandwidth B may be configured by a predefined fixed parameter.

For example, the predefined configuration may be used with respect to configuration information 1 (frequency-axis RB allocation information) and configuration information 2 (time-axis control resource set duration) among plural pieces of configuration information of Table 1. For example, if it is assumed that bandwidth B after the change is X MHz, the control resource set, when it operates at bandwidth B, may be predefined as successive RBs corresponding to Y MHz (where the Y value may be expressed as a function of X, or may have no relation with the same) on frequency axis, and may be predefined to be located in M OFDM symbols on time axis. This may be called "sub-control resource set configuration information B". The terminal may change the bandwidth from bandwidth A to bandwidth B in accordance with the bandwidth adaptation indication, and in this case, the control resource set may be determined on the assumption that the control resource set at bandwidth B is "sub-control resource set configuration information B" that is the predefined control resource set configuration information.

The configuration information on the sub-control resource set as described above may be respectively defined with respect to a plurality of bandwidth configurations. For example, plural pieces of predefined sub-control resource set configuration information may exist as follows.

Bandwidth A→sub-control resource set configuration information A

Bandwidth B→sub-control resource set configuration information B

Bandwidth C→sub-control resource set configuration information C

Further, a part of the sub-control resource set configuration information may be fixed as a system parameter, or may be determined as a function of configuration information of the bandwidth intended to be changed. For example, the configuration information of the sub-control resource set may be determined as described in Table 2 below. Table 2 represents an example of the sub-control resource set configuration information.

The terminal may receive the downlink control channel through the predefined sub-control resource set as described above in the changed bandwidth after the bandwidth adaptation.

Sixth Embodiment

Figure 15:
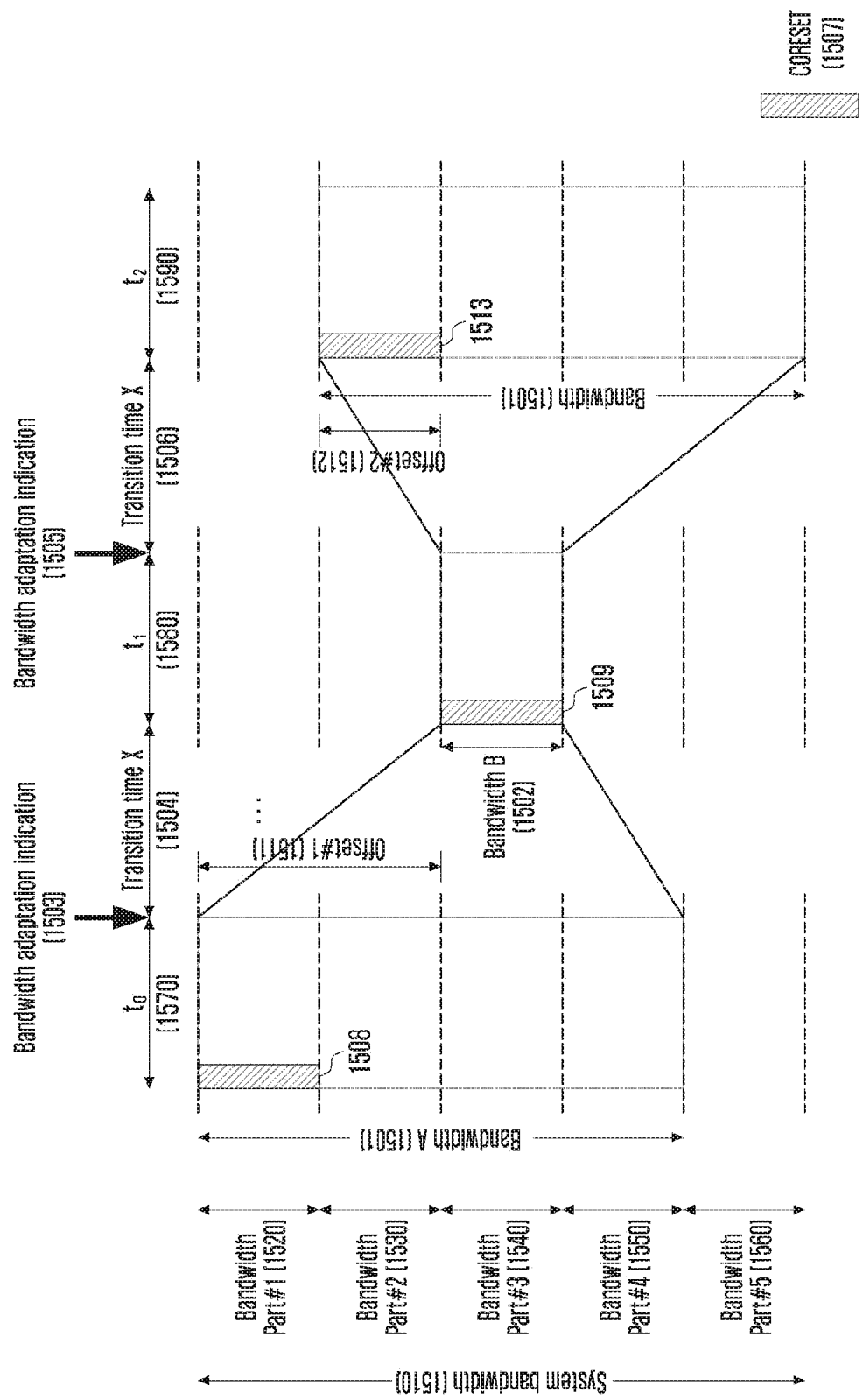
FIG. 15 is a diagram illustrating a sixth embodiment of the disclosure.

FIG. 15 is a diagram illustrating a bandwidth adaptation method and a method for configuring a control resource set for a downlink control channel according to a sixth embodiment of the disclosure.

Referring to FIG. 15, an example is illustrated in which a total system bandwidth 1510 is composed of 5 bandwidth parts, that is, bandwidth part #1 1520, bandwidth part #2 1530, bandwidth part #3 1540, bandwidth part #4 1550, and bandwidth part #5 1560, and a specific control resource set 1507 is configured in a terminal.

The terminal may receive downlink control information, for example, DCI, through control resource set 1508 before bandwidth change (at time t0 1570). FIG. 15 illustrates an example in which the terminal operates at bandwidth A 1501 at time t0 1570, and receives a bandwidth adaptation indication 1503. After a bandwidth change time X 1504 elapses, the terminal operates at bandwidth B 1502 at time t1 1580. Further, FIG. 15 illustrates an example in which the terminal operates at bandwidth B 1502 at time t1 1580, and receives a bandwidth adaptation indication 1505. After a bandwidth change time X 1506 elapses, the terminal operates at bandwidth A 1501 at time t2 1590.

In the sixth embodiment of the disclosure, after a bandwidth adaptation operation, the terminal may be notified of a frequency offset 1511 between the control resource set 1508 before the bandwidth change and the control resource set 1509 after the bandwidth change. For example, referring to FIG. 15, if the frequency location of the control resource set is changed from 1508 to 1509 as the terminal operates at bandwidth A 1501 at time t0 1570 and then operates at bandwidth B 1502 at time t1 1580, the terminal may be notified of information on offset #1 1511 corresponding to a difference between the frequency locations.

TABLE 2

Configuration information 1. Frequency-axis RB allocation information
    Allocation of successive RBs corresponding to Y MHz. Y = f (size of bandwidth to be changed (X MHz))
Configuration information 2. Time-axis control resource set duration (the number of OFDM symbols configured as control resource set)
    Allocation to M symbols. M = = f (size of bandwidth to be changed (X MHz))
Configuration information 3. Resource mapping type (time-preferential mapping)
    Frequency-preferential mapping (fixed)
Configuration information 4. Transmission mode (localized transmission type, distributed transmission type)
    Frequency-preferential mapping (fixed)
Configuration information 5. Search space type (common search space, UE-group search space, UE-specific search space)
    Common search space (if size of bandwidth to be changed > Z MHz)
UE-specific search space (if size of bandwidth to be changed < Z MHz)
    Configuration information 6. Monitoring occasion (monitoring period/interval, monitoring symbol location in slot)
        Slot period monitoring (fixed)
Configuration information 7. DMRS configuration information (DMRS structure, DMRS port number)
    1-port DMRS transmission (fixed)
Configuration information 8. REG bundling size
−> 2 REG bundling (fixed)

Further, referring again to FIG. 15, if the frequency location of the control resource set is changed from 1509 to 1513 as the terminal operates at bandwidth B 1502 at time t1 1580 and then operates at bandwidth A 1501 at time t2 1590, the terminal may be notified of information on offset #2 1512 corresponding to a difference between the frequency locations. Signaling for frequency offsets 1511 and 1512 may be dynamically configured using L1 signaling, for example, DCI.

Figure 16:
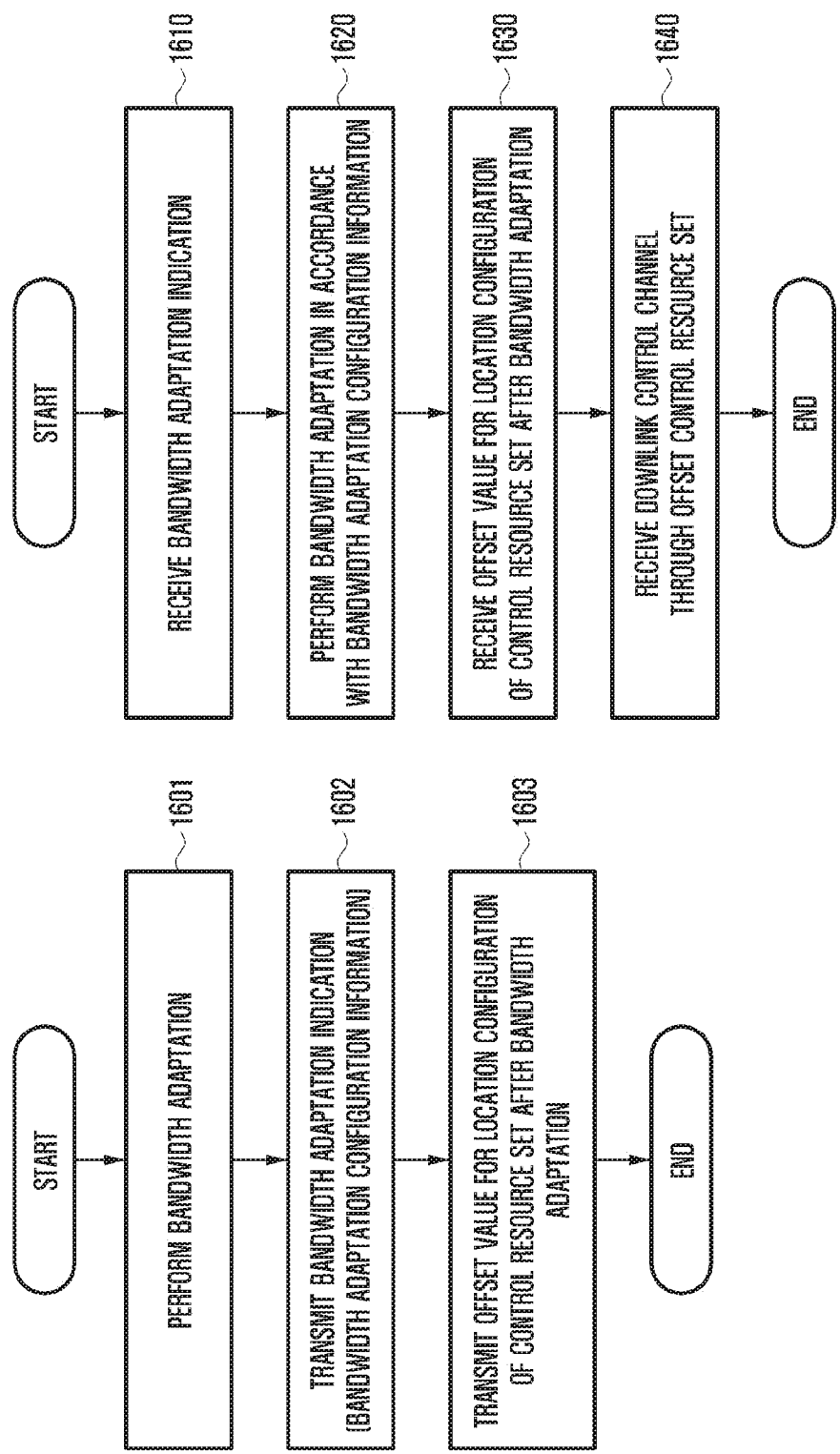
FIG. 16 is a diagram illustrating operations of a base station and a terminal according to a sixth embodiment of the disclosure.

FIG. 16 is a diagram illustrating base station and terminal procedures according to a sixth embodiment of the disclosure.

Referring to FIG. 16, first, a base station procedure will be described. At operation 1601, the base station may configure the bandwidth adaptation operation with respect to the terminal. At operation 1602, the base station may transmit a bandwidth adaptation indication to the terminal in various methods corresponding to upper layer or L1 signaling or a combination thereof as in the (1-1)-th embodiment and the (1-2)-th embodiment as described above.

At operation 1603, the base station may transmit a frequency offset value for location configuration of the control resource set in the changed bandwidth after the bandwidth adaptation. Here, the frequency offset means a difference between the frequency location of the control resource set before the bandwidth change and the frequency location of the control resource set after that bandwidth change.

Next, a terminal procedure will be described. At operation 1610, the terminal may receive the bandwidth adaptation indication from the base station. At operation 1620, the terminal may perform the bandwidth adaptation in accordance with the bandwidth adaptation configuration information indicated by the received bandwidth adaptation indication. At operation 1630, the terminal may receive the frequency offset value for the location configuration of the control resource set in the changed bandwidth after the bandwidth adaptation. At operation 1640, the terminal may receive the downlink control message through the reconfigured (offset) control resource set.

Seventh Embodiment

Figure 17:
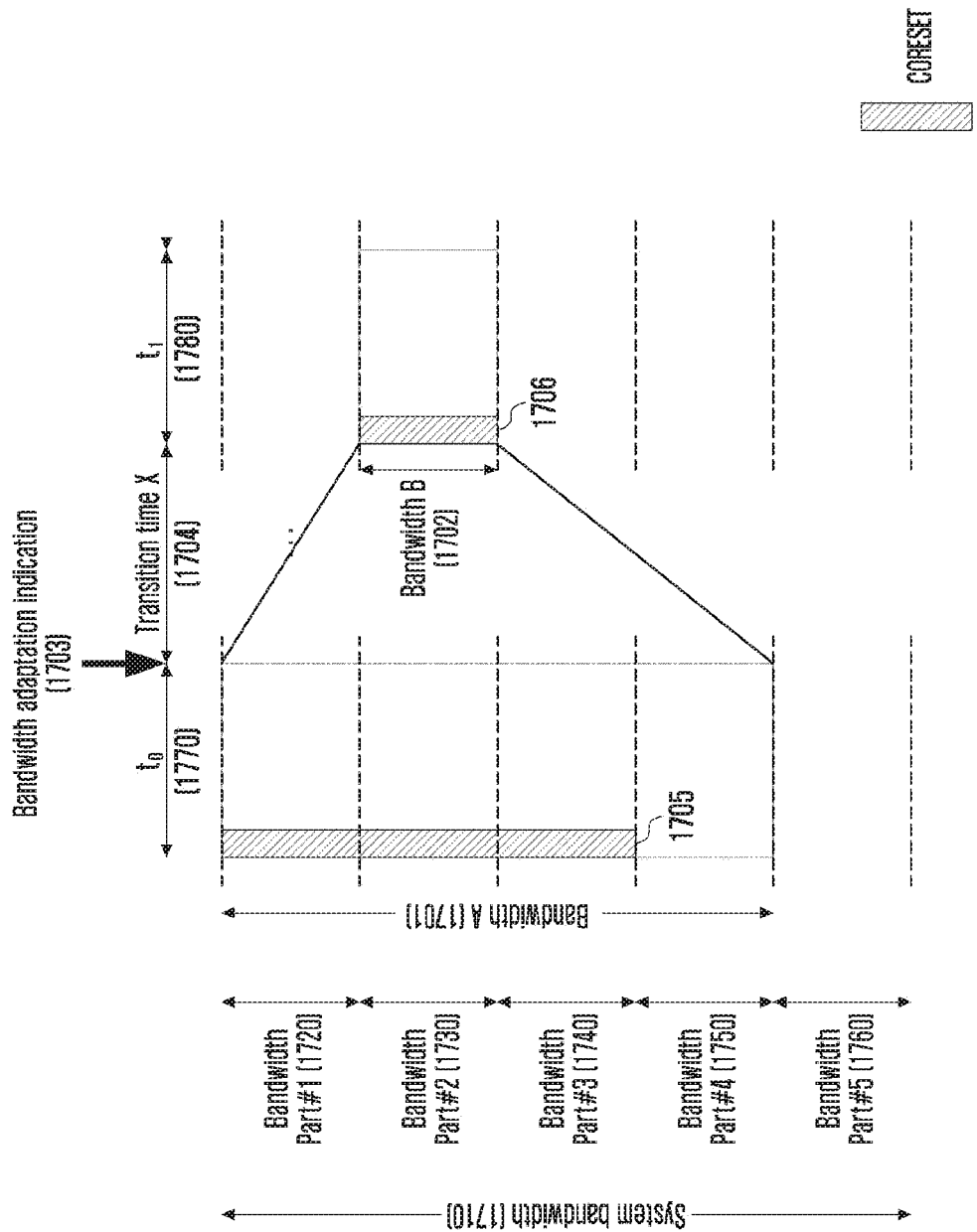
FIG. 17 is a diagram illustrating a seventh embodiment of the disclosure.

FIG. 17 is a diagram illustrating a bandwidth adaptation method and a method for configuring a control resource set for a downlink control channel according to a seventh embodiment of the disclosure.

Referring to FIG. 17, an example is illustrated in which the total system bandwidth 1710 is composed of 5 bandwidth parts, that is, bandwidth part #1 1720, bandwidth part #2 1730, bandwidth part #3 1740, bandwidth part #4 1750, and bandwidth part #5 1760, and a specific control resource set 1707 is configured in a terminal. The terminal may receive downlink control information, for example, DCI, through control resource set 1705 before bandwidth change (at time t0 1770). FIG. 17 illustrates an example in which the terminal operates at bandwidth A 1701 at time t0 1770, and receives a bandwidth adaptation indication 1703. After a bandwidth change time X 1704 elapses, the terminal operates at bandwidth B 1702 at time t1 1780.

In the seventh embodiment of the disclosure, a control resource set 1706 after the bandwidth change may be a part of the control resource set 1705 before the bandwidth change. More specifically, in an example of FIG. 17, the control resource set 1705 before the bandwidth change is configured as bandwidth part #1 1720, bandwidth part #2 1730, and bandwidth part #3 1740, and the control resource set 1706 after the bandwidth change is configured as bandwidth part #3 1740. Accordingly, the bandwidth change may be performed in a manner that the control resource set 1706 before the bandwidth change includes the control resource set 1705 after the bandwidth change.

In this case, since the terminal has already known configuration information of the control resource set 1705 before the bandwidth change and configuration information of bandwidth B 1702 after the bandwidth change, the terminal can know the location of the control resource set 1706 after the bandwidth change, in other words, existence of the control resource set in bandwidth part #3 1740, without additional signaling.

In the seventh embodiment of the disclosure, the search space of the control resource set 1706 after the bandwidth change may be composed of a subset of the search space of the control resource set 1705 before the bandwidth change. In this case, the base station may transmit the DCI through the search space corresponding to the control resource set 1706 after the bandwidth change, and the terminal may perform blind decoding for the corresponding search space. In other words, the DCI transmission/reception to the search space existing in the control resource set 1706 after the bandwidth change may be performed in a state where the search space of the control resource set 1705 before the bandwidth change is maintained as it is.

More specifically, it is assumed that in FIG. 17, a universal set of the search space of the control resource set before the bandwidth change is composed of {search space #1, search space #2, search space #3}, and the control resource set 1705 before the bandwidth change is configured as bandwidth part #1 1720, bandwidth part #2 1730, and bandwidth part #3 1740. In this case, among search spaces of the control resource set 1705 before the bandwidth change, search space #1 may exist in bandwidth part #1 1720, search space #2 may exist in bandwidth part #2 1730, and search space #3 may exist in bandwidth part #3 1740. Accordingly, if bandwidth B 1702 after the bandwidth change is changed to bandwidth part #2 1730, the control resource set 1706 after the bandwidth change may exist in bandwidth part #2 1730, and the base station and the terminal may transmit and receive the DCI through search space #2 existing in bandwidth part #2.

Accordingly, in the seventh embodiment of the disclosure, if the control resource set 1706 after the bandwidth change is composed of a subset of the control resource set 1705 before the bandwidth change, the DCI transmission/reception using the search spaces existing in the control resource set 1706 after the bandwidth change becomes possible without configuration of an additional control resource set.

(7-1)-th Embodiment

In the (7-1)-th embodiment of the disclosure, if the control resource set 1706 after the bandwidth change is composed of the subset of the control resource set 1705 before the bandwidth change, the search space for the control resource set 1706 after the bandwidth change may be reconfigured. The search space in the control resource set may be represented as a function for various system parameters. For example, this may be expressed by the following mathematical expression.

$$\text{Search space} = f(Y_k, \text{NR-CCE index}, \text{NR-CCE number}, \text{AL}, \text{NR-PDCCH candidate number}, \text{control resource set duration}) \quad \text{Equation 1}$$

In mathematical expression 1 as above, f(x) denotes a function having x as an input value. Accordingly, the search space may be expressed as a function for parameters of the number of NR-CCEs in the control resource set, an NR-CCE index, an aggregation level (AL), the number of NR-PDCCH candidates, and a control resource set duration (the number of OFDM symbols with configured control resource sets). In the above-described mathematical expression, the Yk value is a certain value that can be applied in the k-th slot or subframe, and an initial value Y−1 may be determined by a terminal ID or a specific fixed value.

In the (7-1)-th embodiment of the disclosure, the control resource set 1706 after the bandwidth change may reconfigure the search space with a system parameter for a part corresponding to the changed bandwidth. For example, in accordance with the bandwidth change, the number of NR-CCEs existing in the control resource set 1706 after the bandwidth change and the NR-CCE index may differ, and based on the changed value, the search space for the control resource set 1706 after the bandwidth change may be reconfigured using, for example, the mathematical expression 1 as described above. In this case, since the terminal has already known the configuration information on the control resource set 1705 before the bandwidth change and the configuration information on bandwidth B 1702 after the bandwidth change in all, the configuration of the search space for the control resource set 1706 after the bandwidth change may be performed through additional signaling, and this can be known by both the base station and the terminal.

Accordingly, the base station can transmit the DCI to the terminal through the reconfigured search space of the control resource set 1706 after the bandwidth change, and the terminal can receive the DCI through blind decoding of the corresponding reconfigured search space.

Figure 18:
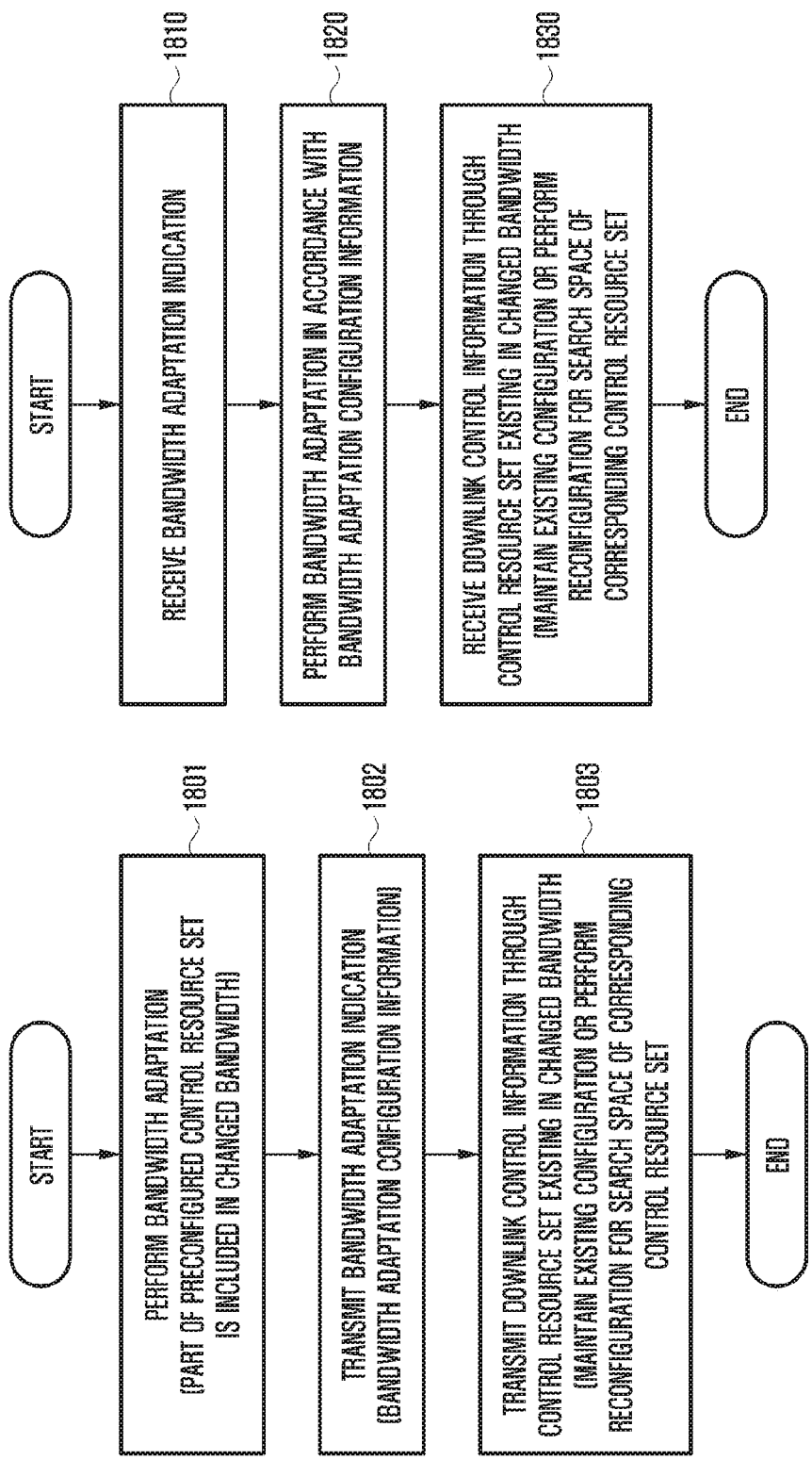
FIG. 18 is a diagram illustrating operations of a base station and a terminal according to a seventh embodiment of the disclosure.

FIG. 18 is a diagram illustrating base station and terminal procedures according to the seventh embodiment and the (7-1)-th embodiment of the disclosure.

Referring to FIG. 18, first, a base station procedure will be described. At operation 1801, the base station may configure the bandwidth adaptation operation with respect to the terminal. In this case, a part of the preconfigured control resource set (control resource set before the bandwidth change) may be included in the bandwidth to be changed. At operation 1802, the base station may transmit a bandwidth adaptation indication to the terminal in various methods corresponding to upper layer or L1 signaling or a combination thereof as in the (1-1)-th embodiment and the (1-2)-th embodiment as described above.

At operation 1803, the base station may transmit downlink control information through the control resource set in the changed bandwidth after the bandwidth adaptation. In this case, the search space existing in the control resource set in the changed bandwidth maintains the existing configuration as it is, and may be a subset for the whole search space (seventh embodiment), or may be the search space reconfigured by the changed system parameter after the bandwidth change ((7-1)-th embodiment).

Next, a terminal procedure will be described. At operation 1810, the terminal may receive the bandwidth adaptation indication from the base station. At operation 1820, the terminal may perform the bandwidth adaptation in accordance with the bandwidth adaptation configuration information indicated by the received bandwidth adaptation indication. At operation 1830, the terminal may receive the downlink control information through the control resource set in the changed bandwidth after the bandwidth adaptation.

In this case, the search space existing in the control resource set in the changed bandwidth maintains the existing configuration as it is, and may be a subset for the whole search space (seventh embodiment), or may be the search space reconfigured by the changed system parameter after the bandwidth change ((7-1)-th embodiment).

Eighth Embodiment

Figure 19:
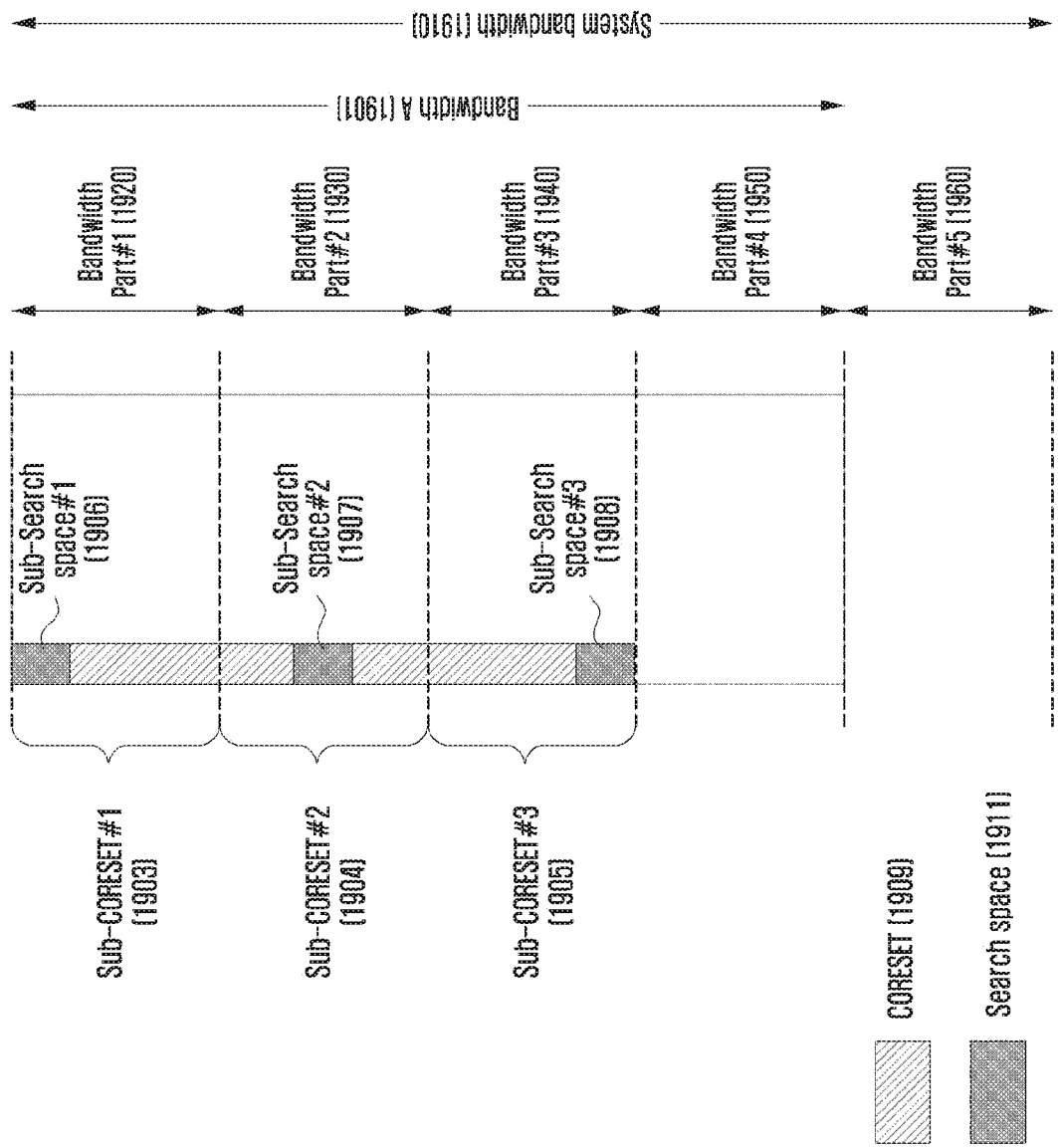
FIG. 19 is a diagram illustrating an eighth embodiment of the disclosure.

FIG. 19 is a diagram illustrating a method for configuring a control resource set and a search space according to an eighth embodiment of the disclosure.

First, a method for configuring a control resource set according to an eighth embodiment of the disclosure will be described.

Referring to FIG. 19, an example is illustrated in which the total system bandwidth 1910 is composed of 5 bandwidth parts, that is, bandwidth part #1 1920, bandwidth part #2 1930, bandwidth part #3 1940, bandwidth part #4 1950, and bandwidth part #5 1960, and a bandwidth 1901 of a terminal. A specific control resource set 1909 is configured in the terminal, and a search space 1911 of the corresponding terminal exists in the control resource set.

A base station may configure the control resource set to the terminal through upper layer signaling, and may provide information, such as, for example, a control resource set location, subband, control resource set resource allocation, and control resource set duration, through the configuration. Further, various pieces of configuration information as described in Table 1 may be provided.

In a method for notifying a terminal of resource allocation information for a control resource set according to an eighth embodiment of the disclosure, the resource allocation information may be notified for each bandwidth part existing in the total system bandwidth, and individual control resource sets existing in respective bandwidth parts (called sub-control resource sets) may constitute one whole control resource set (called a main control resource set). For example, one main control resource set may be composed of one or a plurality of sub-control resource sets, and resource allocation of the main control resource set may follow a set of resource allocations of the whole sub-control resource sets.

Examples will be described with reference to the drawing. In the eighth embodiment of the disclosure, one main control resource set configured to one terminal may be composed of one or a plurality (i.e., N (N≥1)) of sub-control resource sets. FIG. 19 illustrates an example in which a control resource set 1909 configured to the terminal is composed of three sub-control resource sets in total, that is, sub-control resource set #1 1903, sub-control resource set #2 1904, and sub-control resource set #3 1905.

Further, the respective sub-control resource sets may exist in a specific bandwidth part or over specific bandwidth parts. Most generally, N sub-control resource sets may exist in M (M≥1) bandwidth parts. FIG. 19 illustrates an example in which, in case of M=N=3, sub-control resource set #1 1903 exists in bandwidth part #1 1920, sub-control resource set #2 1904 exists in bandwidth part #2 1930, and sub-control resource set #3 1905 exists in bandwidth part #3 1940.

In this case, the base station may notify the terminal of resource allocation information for a control resource set in Method 1 below. The base station may notify the terminal through upper layer signaling, for example, RRC signaling.

Method 1

A method for a base station to notify of resource allocation information for a main control resource set may follow operation 1 and operation 2 below.

Operation 1: Bandwidth part information to which the main control resource set 1909 is allocated may be notified.

As an example, if M bandwidth parts in total exist in the system bandwidth, this may be notified in a bitmap method using M bits in total. For example, referring to FIG. 19, since 5 bandwidth parts in total exist in the system bandwidth, and the control resource set is allocated to bandwidth part #1 1920, bandwidth part #2 1930, and bandwidth part #3 1940, the bandwidth part allocation information may be notified as [1 1 1 0 0].

As another example, if N bandwidth parts in total exist in the bandwidth of the terminal, this may be notified in a bitmap method using N bits in total. For example, referring to FIG. 19, since 4 bandwidth parts in total exist in bandwidth A 1901 of the terminal, and the control resource set is allocated to bandwidth part #1 1920, bandwidth part #2 1930, and bandwidth part #3 1940, the bandwidth part allocation information may be notified as [1 1 1 0].

Operation 2: Resource allocation information for sub-control resource sets may be notified for each bandwidth part allocated at operation 1 as described above. As an example, the resource allocation information for sub-control resource sets existing in a specific bandwidth part composed of NRB RBs in total may be notified in a bitmap method using NRB bits. Further, as another example, if the sub-control resource sets are allocated to specific NRB RBs of the bandwidth part composed of NRB RBs in total, combined indexes corresponding to the allocated RB indexes may be notified, for example, as $$\binom{N_{RB}}{M_{RB}}.$$

The resource allocation information for respective sub-control resource sets may be different from each other or may be equal to each other. If the resource allocation information for respective sub-control resource sets are different from each other, the base station may notify the terminal of all the resource allocation information for the respective sub-control resource sets. If the resource allocation information for the respective sub-control resource sets are equal to each other, only the resource allocation information for a specific sub-control resource set can be signaled, and the terminal may equally apply this to the resource allocation information for other sub-control resource sets.

In case of following the Method 1, the base station may notify the terminal of the resource allocation information for the main control resource set through upper layer signaling, for example, RRC signaling or MAC CE signaling, using operation 1 and operation 2. The terminal may receive the resource allocation information for the main control resource set by combining the bandwidth part allocation information for the main control resource set (operation 1) and the resource allocation information for the sub-control resource sets for each bandwidth part (operation 2) provided from the base station. The base station may transmit the downlink control information of the corresponding terminal through the configured main resource region, and the terminal may receive the downlink control information from the base station through the configured main resource region.

As another example, the resource allocation information for the main control resource set may be notified in Method 2 below.

Method 2

In the method for the base station to notify of the resource allocation information for the main control resource set, only information for a bandwidth part to which the main control resource set 1909 may be notified. Here, the same method as the operation 1 of the above-described Method 1 may be applied. In the allocated bandwidth part, the main control resource set may be allocated over the whole RB. Accordingly, if the sub-control resource set exists in the allocated bandwidth part, the resource allocation of the corresponding sub-control resource set may be allocated over the whole RB constituting the bandwidth part.

In case of following the Method 2, the base station may notify the terminal of only information on the bandwidth part to which the main control resource set is allocated as the resource allocation information for the main control resource set through upper layer signaling, for example, RRC signaling or MAC CE signaling, or may transmit the downlink control information to the corresponding terminal through configuration of the control resource set over the whole RB in the allocated bandwidth part. The terminal may receive bandwidth part allocation information for the main control resource set, may receive the resource allocation information for the main control resource set through this, and may receive the downlink control information from the base station through the configured main resource region.

A part or the whole of other configuration information excluding the resource allocation information of respective sub-control resource sets 1906, 1907, and 1908 may be configured equally to the control resource set 1909. For example, among various pieces of configuration information of the control resource set 1909, the time-axis control resource set duration (the number of OFDM symbols), transmission mode, and resource mapping type (in addition to various pieces of configuration information existing in table 1) may be equally applied to the sub-control resource sets 1906, 1907, and 1908. Further, the respective sub-control resource sets 1906, 1907, and 1908 may have different configurations.

Next, a method for configuring a search space according to the eighth embodiment of the disclosure will be described.

In the method for configuring a search space in a control resource set according to the eighth embodiment of the disclosure, one search space (called a main search space) may be composed of a set of one or a plurality of partial search spaces (called sub-search spaces).

If the main control resource set is allocated to one or a plurality of bandwidth parts, the sub-search spaces may exist in a specific bandwidth part or in a plurality of bandwidth parts.

Further, if the main control resource set is composed of one or a plurality of sub-control resource sets, the sub-search spaces may exist in a specific sub-control resource set or in a plurality of sub-control resource sets.

An example will be described with reference to the drawing. FIG. 19 illustrates an example in which one main control resource set 1909 is allocated over 3 bandwidth parts, that is, bandwidth part #1 1920, bandwidth part #2 1930, and bandwidth part #3 1940, and is composed of 3 sub-control resource sets, that is, sub-control resource set #1 1903, sub-control resource set #2 1904, and sub-control resource set #3 1905.

A main search space 1911 existing in the main control resource set 1909 may be composed of a set of sub-search spaces 1906, 1907, and 1908 existing in the respective sub-control resource sets 1903, 1904, and 1905 (or bandwidth parts). For example, referring to FIG. 19, the sub-search space #1 1906 may exist in the sub-control resource set #1 1903, the sub-search space #2 1907 may exist in the sub-control resource set #2 1904, and the sub-search space #3 1908 may exist in the sub-control resource set #3 1905, and the sub-search space #1 1906, the sub-search space #2 1907, and the sub-search space #3 may constitute one main search space 1911.

In general, the search space existing in the control resource set may be expressed by the following mathematical expression 2.

$$S_k^{(L)} = f(Y_k, N_{CCE}, N_{cand}, L, x) \quad \text{Equation 2}$$

In the mathematical expression 2, f(·) means a certain function. $S_k^{(L)}$ is defined as a search space corresponding to aggregation level (AL)=L in the k-th slot, that is, a set of PDCCH candidates. $Y_k$ is a parameter determining a search space in the k-th slot, and may be defined as $Y_k = f(Y_{k-1}, A, D)$. Here, A and D are certain constants, and $Y_{-1}$ may have a predefined fixed value, may be configured by the base station, or may be defined as a value, such as a terminal ID or a group ID. $N_{CCE}$ means the number of CCEs (or NR-CCEs) existing in the control resource set, L means AL, and $N_{cand}$ means the total number of PDCCH candidates corresponding to AL=L. Further, x means another system parameter determining other search spaces. According to the mathematical expression 2, the search space may be expressed as a set of CCE indexes.

A method for configuring a search space in a control resource set according to the eighth embodiment of the disclosure may follow the following Method 1.

Method 1

Sub-search spaces may be independently configured, and a set of sub-search spaces may constitute the search space.

For example, the m-th sub-search space may be expressed by the following mathematical expression 3.

$$S_k^{(L)}(m) = f(Y_k(m), N_{CCE}(m), N_{cand}(m), L(m), x(m)) \quad \text{Equation \#3}$$

In the mathematical expression 3, $S_k^{(L)}(m)$ means the m-th sub-search space corresponding to aggregation level (AL)=L in the k-th slot. $Y_k(m)$ is a parameter determining the m-th sub-search space in the k-th slot, and may be defined as, for example, $Y_k(m) = f(Y_{k-1}(m), A, D)$. Here, A and D are certain constants, and $Y_{-1}(m)$ may have a predefined fixed value, may be configured by the base station, or may be determined as a value, such as a terminal ID or a group ID. $N_{CCE}(m)$ means the number of CCEs existing in a time/frequency resource existing in the m-th sub-search space. For example, if the m-th sub-search space exists in the m-th sub-control resource set or in the m-th bandwidth part, it means the total number of CCEs existing in the m-th sub-control resource set or in the m-th bandwidth part. L(m) means AL, and is an element of a set of ALs supportable in the m-th sub-search space. $N_{cand}(m)$ means the number of PDCCH candidates corresponding to AL=L(m). Further, x(m) means various system parameters determining other m-th sub-search spaces. For example, x(m) may be an index of the bandwidth part or an index of the sub-control resource set.

If the main search space is composed of m sub-search spaces, the corresponding main search space may be expressed by the following mathematical expression 4.

$$S_k^{(L)} = \bigcup_{m=1}^{M} S_k^{(L)}(m) \quad \text{Equation 4}$$

In the mathematical expression 4, ∪ means a union operation.

Respective sub-search spaces may differ from each other. For example, they may satisfy $S_k^{(L)}(m) \neq S_k^{(L)}(n)$ for m≠n. If the sub-search space exists in a specific sub-control resource set or in a bandwidth part, the sub-search space may be sub-control resource set—specific or bandwidth part—specific.

The respective sub-search spaces may be equal to each other. For example, the m-th sub-search space and the n-th sub-search space may be different from each other. For example, they may satisfy $S_k^{(L)}(m) = S_k^{(L)}(n)$ for m≠n. If the sub-search space exists in a specific sub-control resource set or in a bandwidth part, the sub-search space may be sub-control resource set—common or bandwidth part—common.

Further, the respective sub-search spaces may roughly be equal to each other, but may have a difference as much as a specific offset. For example, the m-th sub-search space and the n-th sub-search space may satisfy $S_k^{(L)}(m) = S_k^{(L)}(n) + \Delta$ for m≠n, where Δ means an index offset between the m-th sub-search space and the n-th sub-search space. In this case, Δ may be predefined, may be configured by the base station, or may be determined by the system parameter. If the sub-search space exists in a specific sub-control resource set or the bandwidth part, the offset value may be determined by the sub-control resource set index or the bandwidth part index.

The sub-search space may be defined only with respect to a specific AL or a subset of the specific AL among the whole AL sets supported by the main control resource set. For example, the sub-search space of the m-th sub-control resource set may be configured with respect to AL={1, 2}, and the sub-search space of the n-th sub-control resource set may be configured with respect to AL={4, 8}.

One sub-search space may be configured over one or a plurality of sub-control resource sets (or bandwidth parts). More specifically, N sub-search spaces may be configured to M sub-control resource sets (or bandwidth parts), and in this case, M=N or M≠N. For example, if 4 sub-control resource sets exist, the first sub-search space may be configured to the {1, 2}-th sub-control resource set, and the second sub-search space may be configured to the {3, 4}-th sub-control resource set, resulting in that 2 search spaces may exist in 4 sub-control resource sets. Accordingly, in accordance with the configuration of a specific sub-search space, a specific PDCCH candidate group may exist over one or a plurality of sub-control resource sets (or bandwidth parts), and the PDCCH may be transmitted through one or a plurality of sub-control resource sets.

If N sub-search spaces are configured to M sub-control resource sets, the N value may be a predefined fixed value, or may be configured through upper layer signaling (e.g., RRC or MAC CE signaling) from the base station.

As described above, since the sub-search space is a subset of the main search space, the total number of sets of PDCCH candidates of the main search space may be equal to the total number of unions of the PDCCH candidates of all sub-search spaces.

The base station may allocate the main control resource set to one or a plurality of bandwidth parts, may configure one or a plurality of sub-search spaces for one or a plurality of bandwidth parts, and may construct the whole main control search space. The base station may configure system parameters (e.g., the number of ALs or PDCCH candidates of the corresponding sub-search space) for the sub-search space existing in a specific bandwidth part to the terminal through upper layer signaling (e.g., RRC or MAC CE signaling). Further, in accordance with a predefined function engaged between the base station and the terminal, the sub-search space can be obtained without additional configuration of the system parameter for the sub-search space. The base station may transmit the downlink control information of the corresponding terminal through the main search space composed of sub-search spaces.

The terminal may receive configuration information for the main control resource set in accordance with the configuration of the base station, and may receive configuration information for one or a plurality of sub-search spaces for one or a plurality of bandwidth parts. The terminal may receive system parameters (e.g., the number of ALs or PDCCH candidates of the corresponding sub-search space) for the sub-search spaces from the base station, and through this, the terminal may operate the sub-search space and may construct the main search space. Further, in accordance with a predefined function engaged between the base station and the terminal, the sub-search space can be obtained without additional configuration of the system parameter for the sub-search space, and through this, it may construct the main search space. The terminal may transmit the downlink control information of the corresponding terminal through the main search space composed of sub-search spaces.

In explaining the disclosure as described above, the sub-control resource sets may be analyzed in the same manner as all the bandwidth parts, and may be replaced with the bandwidth parts. This is because the sub-control resource sets can exist in the specific bandwidth part configured as the main control resource set.

In explaining the disclosure as described above, the sub-control resource sets may be analyzed in the same manner as the control resource sets, and may be replaced with the control resource sets. This is because the control resource set can be composed of one sub-control resource set according to circumstances.

An embodiment of the disclosure provides a method for monitoring a downlink control channel. In the method for a terminal to monitor the downlink control channel, the terminal may perform blind decoding in accordance with the configuration of a base station. The number of times of blind decoding with respect to the downlink control channel may be determined as the number of PDCCH candidates constituting the search space, and may be determined by other various system parameters. The base station may instruct the terminal to perform blind decoding with respect to specific PDCCH candidates in the search space.

In the disclosure, through the following methods, the terminal's blind decoding for the downlink control channel may be controlled.

Method 1

The base station may instruct the terminal to perform only blind decoding with respect to a specific AL. For example, if a search space is defined for M ALs as a whole, the base station may configure that the blind decoding is performed only with respect to the search space for the specific N ALs. Further, the base station may instruct the terminal not to perform blind decoding with respect to the specific AL. For example, if a search space for L ALs as a whole is defined, it may be configured not to perform blind decoding with respect to the search space for the specific N ALs.

The base station may configure the above-described contents to the terminal through upper layer signaling, for example, RRC signaling or MAC CE signaling. Further, the base station may configure the above-described contents to the terminal through L1 signaling, for example, common downlink control information or group common control information.

The terminal may be configured by the base station to perform only blind decoding of the specific AL, and thus may perform the blind decoding with respect to the configured specific AL when performing the blind decoding after receiving the downlink control channel.

Further, the terminal may be configured not to perform the blind decoding of the specific AL, and thus may not perform the blind decoding of the configured specific AL when performing the blind decoding after receiving the downlink control channel.

The terminal may receive the above-described contents from the base station through upper layer signaling, for example, RRC signaling or MAC CE signaling. Further, the terminal may receive the above-described contents from the base station through L1 signaling, for example, common downlink control information or group common control information.

Method 2

The base station may instruct the terminal to perform blind decoding only with respect to a search space existing in a specific bandwidth part among bandwidths configured as the control resource set. For example, if resource allocation has been performed to the control resource set over M bandwidth parts, the base station may configure that the blind decoding is performed only with respect to the specific N bandwidth parts.

Further, the base station may instruct the terminal not to perform blind decoding only with respect to the search space existing in the specific bandwidth part among bandwidths configured as the control resource set. For example, if the resource allocation has been performed to the control resource set over M bandwidth parts, it may be configured not to perform blind decoding only with respect to the specific N bandwidth parts.

The base station may configure the above-described contents to the terminal through upper layer signaling, for example, RRC signaling or MAC CE signaling. Further, the base station may configure the above-described contents to the terminal through L1 signaling, for example, common downlink control information or group common control information.

The terminal may be configured by the base station to perform blind decoding only with respect to the search space existing in the specific bandwidth part among the bandwidths configured as the control resource set, and thus may perform the blind decoding with respect to the search space existing in the configured specific bandwidth part when performing the blind decoding after receiving the downlink control channel.

Further, the terminal may be configured by the base station not to perform the blind decoding only with respect to the search space existing in the specific bandwidth part among the bandwidths configures as the control resource set, and thus may not perform the blind decoding with respect to the search space existing in the specific bandwidth part when performing the blind decoding after receiving the downlink control channel.

The terminal may receive the above-described contents from the base station through upper layer signaling, for example, RRC signaling or MAC CE signaling. Further, the terminal may receive the above-described contents from the base station through L1 signaling, for example, common downlink control information or group common control information.

Method 3

The base station may instruct the terminal to perform blind decoding only with respect to a search space existing in a specific sub-control resource set if the control resource set is composed of one or a plurality of sub-control resource sets. For example, if the control resource set is composed of M sub-control resource sets, the base station may configure that the blind decoding is performed only with respect to the specific N sub-control resource sets.

Further, the base station may instruct the terminal not to perform blind decoding only with respect to the search space existing in the specific sub-control resource set if the control resource set is composed of one or a plurality of sub-control resource sets. For example, if the control resource set is composed of M sub-control resource sets, it may be configured not to perform blind decoding only with respect to the specific N sub-control resource sets.

The base station may configure the above-described contents to the terminal through upper layer signaling, for example, RRC signaling or MAC CE signaling. Further, the base station may configure the above-described contents to the terminal through L1 signaling, for example, common downlink control information or group common control information.

The terminal may be configured by the base station to perform blind decoding only with respect to the search space existing in the specific sub-control resource set among the sub-control resource sets constituting the control resource set, and thus may perform the blind decoding with respect to the search space existing in the configured specific sub-control resource set when performing the blind decoding after receiving the downlink control channel.

Further, the terminal may be configured by the base station not to perform the blind decoding only with respect to the search space existing in the specific sub-control resource set among the sub-control resource sets constituting the control resource set, and thus may not perform the blind decoding with respect to the search space existing in the configured specific sub-control resource set when performing the blind decoding after receiving the downlink control channel.

The terminal may receive the above-described contents from the base station through upper layer signaling, for example, RRC signaling or MAC CE signaling. Further, the terminal may receive the above-described contents from the base station through L1 signaling, for example, common downlink control information or group common control information.

Method 4

The base station may instruct the terminal to perform blind decoding only with respect to a specific sub-search space if the search space is composed of one or a plurality of sub-search spaces. For example, if the search space is composed of M sub-search spaces, the base station may configure that the blind decoding is performed only with respect to the specific N sub-search spaces.

Further, the base station may instruct the terminal not to perform blind decoding only with respect to the specific sub-search space if the search space is composed of one or a plurality of sub-search spaces. For example, if the search space is composed of M sub-search spaces, it may be configured not to perform blind decoding only with respect to the specific N sub-search spaces.

The base station may configure the above-described contents to the terminal through upper layer signaling, for example, RRC signaling or MAC CE signaling. Further, the base station may configure the above-described contents to the terminal through L1 signaling, for example, common downlink control information or group common control information.

The terminal may be configured by the base station to perform blind decoding only with respect to the specific sub-search space among the sub-search spaces constituting the search space, and thus may perform the blind decoding with respect to the configured specific sub-search space when performing the blind decoding after receiving the downlink control channel.

Further, the terminal may be configured by the base station not to perform the blind decoding only with respect to the specific sub-search space among the sub-search spaces constituting the search space, and thus may not perform the blind decoding with respect to the configured specific sub-search space when performing the blind decoding after receiving the downlink control channel.

The terminal may receive the above-described contents from the base station through upper layer signaling, for example, RRC signaling or MAC CE signaling. Further, the terminal may receive the above-described contents from the base station through L1 signaling, for example, common downlink control information or group common control information.

Method 5

The base station may configure a scaling value for the number of times of blind decoding to be performed. The base station may instruct the terminal to perform the number of times of blind decoding (M=N*x/100) corresponding to x % of the whole number N of times of blind decoding, and for example, x may have values of x=100, 75, 50, 25, and 0.

In a method for applying the scaling value for the number of times of the blind decoding, blind decoding may be performed with respect to specific PDCCH candidates in a search space. For example, if the total number of times of blind decoding is N, the number of PDCCH candidates for each AL=l, that is, the number of times of blind decoding is Nl (l=1, 2, . . . , L), and the scaling value is x %, Ml=Nl*x/100 may be applied with respect to the number of times of blind decoding for each AL. In this case, the PDCCH candidates to perform the blind decoding may be selected in the order of PDCCH candidates having low CCE indexes or in the order of PDCCH candidates having high CCE indexes.

Further, in the method for applying the scaling value for the number of times of the blind decoding, blind decoding may be performed with respect to a search space in a specific bandwidth part among bandwidth parts constituting a bandwidth to which a control resource set is allocated. For example, if the total control resource sets are allocated to N bandwidth parts, and the scaling value is x %, blind decoding may be performed with respect to the search space existing in M=N*x/100 bandwidth parts. In this case, the bandwidth parts to perform the blind decoding may be selected in the order of bandwidth parts having low bandwidth indexes or in the order of bandwidth parts having high bandwidth indexes.

Further, in the method for applying the scaling value for the number of times of the blind decoding, blind decoding may be performed with respect to a search space in a specific sub-control resource set among sub-control resource sets constituting a control resource set. For example, if the control resource set is composed of N sub-control resource sets in total, and the scaling value is x %, blind decoding may be performed with respect to the search space existing in M=N*x/100 sub-control resource sets. In this case, the sub-control resource sets to perform the blind decoding may be selected in the order of sub-control resource sets having low sub-control resource set indexes or in the order of sub-control resource sets having high sub-control resource indexes.

Further, in the method for applying the scaling value for the number of times of the blind decoding, blind decoding may be performed with respect to a specific sub-search space among sub-search spaces constituting a search space. For example, if the search space is composed of N sub-search spaces in total, and the scaling value is x %, blind decoding may be performed with respect to M=N*x/100 sub-search spaces. In this case, the sub-search spaces to perform the blind decoding may be selected in the order of sub-search spaces having low sub-search space indexes or in the order of sub-search spaces having high sub-search space indexes.

The base station may configure the above-described contents to the terminal through upper layer signaling, for example, RRC signaling or MAC CE signaling. Further, the base station may configure the above-described contents to the terminal through L1 signaling, for example, common downlink control information or group common control information.

The base station may configure the scaling value for the number of times of blind decoding to be performed to the terminal. The base station may receive from the terminal configuration information for the base station to instruct the terminal to perform the number of times of blind decoding M=N*x/100 corresponding to x % with respect to the total number of times of blind decoding, and thus can control the number of times of blind decoding for the downlink control channel.

In the method for the terminal to apply the scaling value for the number of times of blind decoding, various methods as described above may be applied as they are. For example, the blind decoding may be performed with respect to the specific PDCCH candidates, the search space existing in the specific bandwidth part, the search space existing in the specific sub-control resource set, or the specific sub-search space.

The terminal may receive the above-described contents from the base station through upper layer signaling, for example, RRC signaling or MAC CE signaling. Further, the terminal may receive the above-described contents from the base station through L1 signaling, for example, common downlink control information or group common control information.

Figure 20:
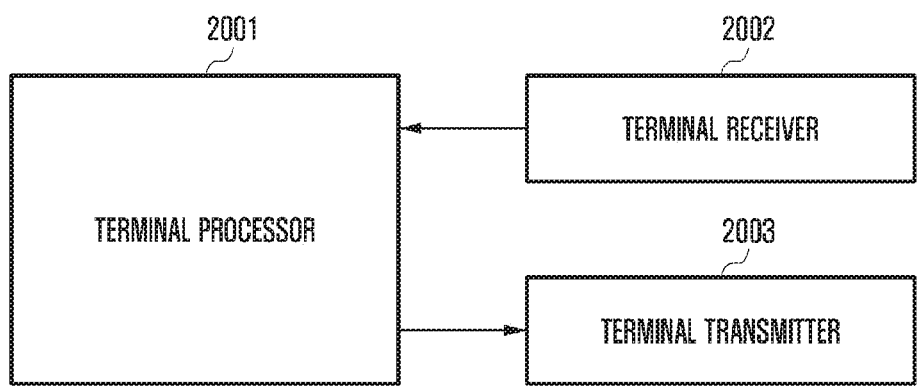
FIG. 20 is a block diagram illustrating an internal structure of a terminal according to an embodiment of the disclosure.
Figure 21:
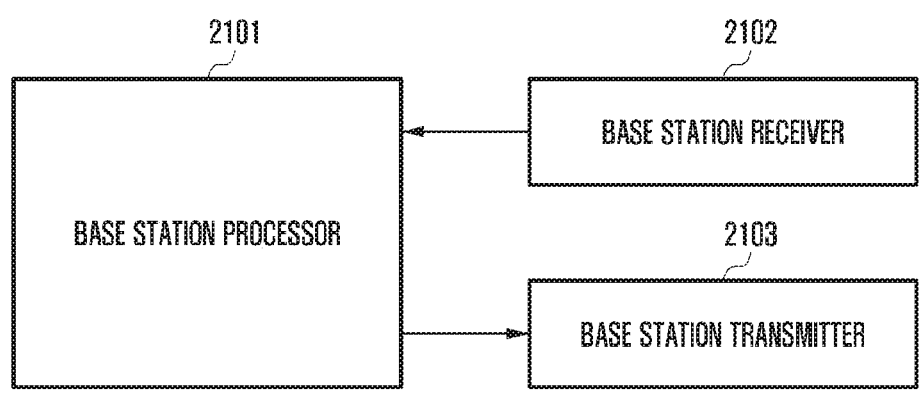
FIG. 21 is a block diagram illustrating an internal structure of a base station according to an embodiment of the disclosure.

In order to perform the above-described embodiments of the disclosure, transmitters, receivers, and processors of a terminal and a base station are illustrated in FIGS. 20 and 21. According to the embodiments as described above, the method for a data channel and a control channel to share resources in the 5G communication system, the method for designating a data start point, and the structures of the base station and the terminal for performing various signaling therefor have been described, and in order to perform this, the transmitters, receivers, and processors of the base station and the terminal should operate in accordance with the respective embodiments.

FIG. 20 is a block diagram illustrating an internal configuration of a terminal according to an embodiment of the disclosure.

Referring to FIG. 20, a terminal may include a terminal processor 2001, a receiver 2002, and a transmitter 2003.

The terminal processor 2001 may control a series of processes in which the terminal can operate according to an embodiment of the disclosure. For example, the terminal processor may differently control the decoding operations for the downlink control channel and the data channel of the terminal in accordance with information on the bandwidth adaptation method, the method for configuring the control resource set for the downlink control channel, and the monitoring method for the downlink control channel.

In an embodiment of the disclosure, the terminal receiver 2002 and the terminal transmitter 2003 may be commonly called a transceiver. The transceiver may transmit/receive a signal to/from a base station. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver of the terminal may receive the signal through a radio channel, output the signal to the terminal processor 2001, and transmit the signal output from the terminal processor 2001 through the radio channel.

FIG. 21 is a block diagram illustrating an internal configuration of a base station that performs operations according to an embodiment of the disclosure.

Referring to FIG. 21, a base station according to the disclosure may include a base station processor 2101, a receiver 2102, and a base station transmitter 2103.

The base station processor 2101 may control a series of processes in which the base station can operate according to an embodiment of the disclosure. For example, the base station processor may differently control the operations in accordance with the bandwidth adaptation method, the method for configuring the control resource set for the downlink control channel, and the monitoring method for the downlink control channel. Further, if needed, the base station controller may control to transmit various additional indications.

In an embodiment of the disclosure, the base station receiver 2102 and the base station transmitter 2103 may be commonly called a transceiver. The transceiver may transmit/receive a signal to/from a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station processor 2101, and transmit the signal output from the base station processor 2101 through the radio channel.

While the disclosure has been shown and described with reference to various embodiments thereof, it will be understood by those skilled in the art that various changes in from and details may be made therein without departing from the spirit and scope of the disclosure as defined by the appended claims and their equivalents.

What is claimed is:

1. A method by a base station in a wireless communication system, the method comprising:
    transmitting, to a terminal, configuration information for configuring a plurality of bandwidth parts for the terminal, the plurality of bandwidth parts including a first bandwidth part and a second bandwidth part;
    transmitting, to the terminal, first downlink control information (DCI) in the first bandwidth part, the first DCI including a bandwidth part related indicator for changing an active bandwidth part from the first bandwidth part to the second bandwidth part, wherein a bitwidth for the bandwidth part related indicator is determined based on a number of the plurality of the bandwidth parts configured by the configuration information; and
    transmitting, to the terminal, second DCI in the second bandwidth part, the second DCI being transmitted in at least one control resource set corresponding to the second bandwidth part,
    wherein one or more control resource sets are configured for each of the plurality of bandwidth parts configured for the terminal,
    wherein the active bandwidth part includes at least one common search space,
    wherein a transmission and a reception is not performed with the terminal for a time duration after transmitting the first DCI,
    wherein the common search space is monitored by the terminal to obtain the second DCI including scheduling information on a system information block, and
    wherein the second DCI is transmitted in the at least one control resource set associated with the common search space.

2. The method of claim 1,
    wherein the configuration information is transmitted on a radio resource control (RRC) signaling, and
    wherein the first DCI is transmitted on physical downlink control channel (PDCCH).

3. The method of claim 1,
    wherein the second DCI is monitored in a search space by the terminal, and
    wherein the search space is determined based on identification information of the terminal.

4. The method of claim 1, further comprising transmitting data in the second bandwidth part based on the second DCI.

5. The method of claim 1, wherein the second DCI includes scheduling information on a system information block, in case that the second DCI is transmitted in the at least one control resource set associated with the common search space.

6. A method by a terminal in a wireless communication system, the method comprising:
    receiving, from a base station, configuration information for configuring a plurality of bandwidth parts for the terminal, the plurality of bandwidth parts including a first bandwidth part and a second bandwidth part;
    receiving, from the base station, first downlink control information (DCI) in the first bandwidth part, the first DCI including a bandwidth part related indicator for changing an active bandwidth part from the first bandwidth part to the second bandwidth part, wherein a bitwidth for the bandwidth part related indicator is determined based on a number of the plurality of the bandwidth parts configured by the configuration information; and
    receiving, from the base station, second DCI in the second bandwidth part, the second DCI being received in at least one control resource set corresponding to the second bandwidth part,
    wherein one or more control resource sets are configured for each of the plurality of bandwidth parts configured for the terminal,
    wherein the active bandwidth part includes at least one common search space,
    wherein a transmission and a reception is not performed with the base station for a time duration after receiving the first DCI,
    wherein the common search space is monitored by the terminal to obtain the second DCI including scheduling information on a system information block, and
    wherein the second DCI is received in the at least one control resource set associated with the common search space.

7. The method of claim 6,
    wherein the configuration information is received on a radio resource control (RRC) signaling, and
    wherein the first DCI is received on physical downlink control channel (PDCCH).

8. The method of claim 6, further comprising:
    determining a search space based on identification information of the terminal, and
    monitoring the second DCI in the determined search space.

9. The method of claim 6, further comprising:
    receiving data in the second bandwidth part; and
    decoding the data based on the second DCI.

10. The method of claim 6, wherein the second DCI includes scheduling information on a system information block, in case that the second DCI is received in the at least one control resource set associated with the common search space.

11. A base station in a wireless communication system, the base station comprising:
    a transceiver; and
    at least one processor configured to:
        transmit, to a terminal via the transceiver, configuration information for configuring a plurality of bandwidth parts for the terminal, the plurality of bandwidth parts including a first bandwidth part and a second bandwidth part,
        transmit, to the terminal via the transceiver, first downlink control information (DCI) in the first bandwidth part, the first DCI including a bandwidth part related indicator for changing an active bandwidth part from the first bandwidth part to the second bandwidth part, wherein a bitwidth for the bandwidth part related indicator is determined based on a number of the plurality of the bandwidth parts configured by the configuration information, and
        transmit, to the terminal via the transceiver, second DCI in the second bandwidth part, the second DCI being transmitted in at least one control resource set corresponding to the second bandwidth part,
    wherein one or more control resource sets are configured for each of the plurality of bandwidth parts configured for the terminal,
    wherein the active bandwidth part includes at least one common search space,
    wherein a transmission and a reception is not performed with the terminal for a time duration after transmitting the first DCI, wherein the common search space is monitored by the terminal to obtain the second DCI including scheduling information on a system information block, and wherein the second DCI is transmitted in the at least one control resource set associated with the common search space.

12. The base station of claim 11, wherein the configuration information is transmitted on a radio resource control (RRC) signaling, and wherein the first DCI is transmitted on physical downlink control channel (PDCCH).

13. The base station of claim 11, wherein the second DCI is monitored in a search space by the terminal, and wherein the search space is determined based on identification information of the terminal.

14. The base station of claim 11, wherein the at least one processor is further configured to control the transceiver to transmit data in the second bandwidth part based on the second DCI.

15. A terminal in a wireless communication system, the terminal comprising:

a transceiver; and at least one processor configured to:

receive, from a base station via the transceiver, configuration information for configuring a plurality of bandwidth parts for the terminal, the plurality of bandwidth parts including a first bandwidth part and a second bandwidth part, receive, from the base station via the transceiver, first downlink control information (DCI) in the first bandwidth part, the first DCI including a bandwidth part related indicator for changing an active bandwidth part from the first bandwidth part to the second bandwidth part, wherein a bitwidth for the bandwidth part related indicator is determined based on a number of the plurality of the bandwidth parts configured by the configuration information, and receive, from the base station via the transceiver, second DCI in the second bandwidth part, the second DCI being received in at least one control resource set corresponding to the second bandwidth part, wherein one or more control resource sets are configured for each of the plurality of bandwidth parts configured for the terminal, wherein the active bandwidth part includes at least one common search space, wherein a transmission and a reception is not performed with the base station for a time duration after receiving the first DCI, wherein the common search space is monitored by the terminal to obtain the second DCI including scheduling information on a system information block, and wherein the second DCI is received in the at least one control resource set associated with the common search space.

16. The terminal of claim 15, wherein the configuration information is received on a radio resource control (RRC) signaling, and wherein the first DCI is received on physical downlink control channel (PDCCH).

17. The terminal of claim 15, wherein the at least one processor is further configured to:

determine a search space based on identification information of the terminal, and monitor the second DCI in the determined search space.

18. The terminal of claim 15, wherein the at least one processor is further configured to:

control the transceiver to receive data in the second bandwidth part, and decode the data based on the second DCI.

* * * * *